(12) United States Patent
Collins et al.

(10) Patent No.: US 11,494,801 B2
(45) Date of Patent: Nov. 8, 2022

(54) METHODS AND MEDIUM FOR TITLE MATERIALS EMBEDDED WITHIN MEDIA FORMATS AND RELATED APPLICATIONS

(71) Applicant: API Market, Inc., San Mateo, CA (US)

(72) Inventors: Kevin Collins, Cupertino, CA (US); Stefan Roever, Los Altos, CA (US); Kevin Wray, San Carlos, CA (US); Alex F. Clark, Redwood City, CA (US); Karl Ginter, Beltsville, MD (US)

(73) Assignee: API Market, Inc., San Mateo, CA (US)

( * ) Notice: Subject to any disclaimer, the term of this patent is extended or adjusted under 35 U.S.C. 154(b) by 27 days.

(21) Appl. No.: 16/206,925

(22) Filed: Nov. 30, 2018

(65) Prior Publication Data

US 2019/0295120 A1 Sep. 26, 2019

Related U.S. Application Data

(63) Continuation of application No. 11/940,747, filed on Nov. 15, 2007, now Pat. No. 10,192,234.

(60) Provisional application No. 60/865,983, filed on Nov. 15, 2006.

(51) Int. Cl.
*G06Q 30/02* (2012.01)
(52) U.S. Cl.
CPC .................. *G06Q 30/0241* (2013.01)
(58) Field of Classification Search
CPC ................................................ G06Q 30/0241
USPC ......................................................... 705/51
See application file for complete search history.

(56) References Cited

U.S. PATENT DOCUMENTS

| 5,063,507 A | 11/1991 | Lindsey |
| 5,455,407 A | 10/1995 | Rosen |
| 5,606,609 A | 2/1997 | Houser et al. |
| 5,629,980 A | 5/1997 | Stefik et al. |
| 5,752,020 A | 5/1998 | Ando |
| 5,778,182 A | 7/1998 | Cathey et al. |
| 5,794,217 A | 8/1998 | Allen |
| 5,812,670 A | 9/1998 | Micali |
| 5,828,751 A | 10/1998 | Walker |
| 5,857,023 A | 1/1999 | Demers et al. |
| 5,892,900 A | 4/1999 | Ginter et al. |
| 5,903,880 A | 5/1999 | Biffar |

(Continued)

FOREIGN PATENT DOCUMENTS

| JP | 02-245970 | 1/1990 |
| JP | 2001-338242 A | 12/2001 |

(Continued)

OTHER PUBLICATIONS

Lohtia, R., Donthu, N., Hershberger, E., The impact of content and design elements on banner advertising click-through rates, Dec. 2003, Journal of advertising Research, 43(4), p. 410-418. (Year: 2003).*

(Continued)

*Primary Examiner* — Jeffrey A. Smith
*Assistant Examiner* — Brittany E Bargeon
(74) *Attorney, Agent, or Firm* — Weaver Austin Villeneuve & Sampson LLP

(57) ABSTRACT

Methods and apparatus are described for enabling actionable content by embedding title materials corresponding to digital bearer instruments in digital media.

23 Claims, 12 Drawing Sheets

(56) References Cited

U.S. PATENT DOCUMENTS

| | | |
|---|---|---|
| 5,905,976 A | 5/1999 | Mjolsnes et al. |
| 5,941,947 A | 8/1999 | Brown et al. |
| 5,956,736 A | 9/1999 | Hanson |
| 6,065,117 A | 5/2000 | White |
| 6,070,171 A | 5/2000 | Snyder et al. |
| 6,078,909 A | 6/2000 | Knutson |
| 6,098,056 A | 8/2000 | Rusnak et al. |
| 6,119,229 A | 9/2000 | Martinez et al. |
| 6,141,006 A | 10/2000 | Knowlton |
| 6,154,214 A | 11/2000 | Uyehara et al. |
| 6,170,744 B1 | 1/2001 | Lee et al. |
| 6,189,097 B1 | 2/2001 | Tycksen, Jr. |
| 6,205,436 B1 | 3/2001 | Rosen et al. |
| 6,212,504 B1 | 4/2001 | Hayosh |
| 6,292,788 B1 | 9/2001 | Roberts et al. |
| 6,327,578 B1 | 12/2001 | Linehan |
| 6,330,544 B1 | 12/2001 | Walker et al. |
| 6,341,353 B1 | 1/2002 | Herman et al. |
| 6,360,254 B1 | 3/2002 | Linden et al. |
| 6,372,974 B1 | 4/2002 | Gross et al. |
| 6,378,075 B1 | 4/2002 | Goldstein et al. |
| 6,389,541 B1 | 5/2002 | Patterson |
| 6,519,573 B1 | 2/2003 | Shade et al. |
| 6,574,609 B1 | 6/2003 | Downs |
| 6,578,078 B1 | 6/2003 | Smith et al. |
| 6,587,867 B1 | 7/2003 | Miller et al. |
| 6,591,260 B1 | 7/2003 | Schwarzhoff et al. |
| 6,600,823 B1 | 7/2003 | Hayosh |
| 6,629,081 B1 | 9/2003 | Cornelius et al. |
| 6,662,340 B2 | 12/2003 | Rawat et al. |
| 6,675,153 B1 | 1/2004 | Cook et al. |
| 6,751,670 B1 | 6/2004 | Patterson |
| 6,772,341 B1 | 8/2004 | Shrader et al. |
| 6,820,204 B1 | 11/2004 | Desai et al. |
| 6,842,741 B1 | 1/2005 | Fujimura |
| 6,868,392 B1 | 3/2005 | Ogasawara |
| 6,871,220 B1 | 3/2005 | Rajan et al. |
| 6,895,392 B2 | 5/2005 | Stefik et al. |
| 6,898,576 B2 | 5/2005 | Stefik et al. |
| 6,910,179 B1 | 6/2005 | Pennell et al. |
| 6,913,193 B1 | 7/2005 | Kawan |
| 6,920,567 B1 | 7/2005 | Doherty et al. |
| 6,925,439 B1 | 8/2005 | Pitroda |
| 6,938,021 B2 | 8/2005 | Shear et al. |
| 6,941,291 B1 | 9/2005 | Zoller et al. |
| 6,944,776 B1 | 9/2005 | Lockhart et al. |
| 6,947,556 B1 | 9/2005 | Matyas et al. |
| 6,947,571 B1 | 9/2005 | Rhoads et al. |
| 7,003,670 B2 | 2/2006 | Heavan et al. |
| 7,010,512 B1 | 3/2006 | Gillin |
| 7,016,877 B1 | 3/2006 | Steele et al. |
| 7,020,626 B1 | 3/2006 | Eng et al. |
| 7,028,009 B2 | 4/2006 | Wang et al. |
| 7,069,234 B1 | 6/2006 | Cornelius et al. |
| 7,069,310 B1 | 6/2006 | Bartholomew |
| 7,099,849 B1 | 8/2006 | Reeder et al. |
| 7,103,574 B1* | 9/2006 | Peinado .............. G06F 21/84 705/57 |
| 7,120,606 B1 | 10/2006 | Ranzini et al. |
| 7,130,829 B2 | 10/2006 | Banerjee et al. |
| 7,191,332 B1 | 3/2007 | Akshan et al. |
| 7,249,107 B2 | 7/2007 | Yaacovi |
| 7,275,260 B2 | 9/2007 | de Jong et al. |
| 7,318,049 B2 | 1/2008 | Iannacci |
| 7,346,923 B2 | 3/2008 | Atkins |
| 7,392,226 B1 | 6/2008 | Sasaki et al. |
| 7,401,221 B2 | 7/2008 | Adent et al. |
| 7,424,747 B2 | 9/2008 | DeTrevilie |
| 7,426,492 B1 | 9/2008 | Bishop et al. |
| 7,444,519 B2 | 10/2008 | Laferriere et al. |
| 7,454,622 B2 | 11/2008 | Laidlaw et al. |
| 7,580,877 B1 | 8/2009 | Argenbright |
| 7,614,078 B1 | 11/2009 | Stieglitz |
| 7,680,819 B1 | 3/2010 | Mellmer et al. |
| 7,707,066 B2 | 4/2010 | Roever |
| 7,707,121 B1 | 4/2010 | Roever et al. |
| 7,774,499 B1 | 8/2010 | Popek et al. |
| 7,814,025 B2 | 10/2010 | Roever |
| 8,170,929 B1 | 5/2012 | Mallon et al. |
| 8,566,461 B1 | 10/2013 | Jun et al. |
| 8,571,992 B2 | 10/2013 | Roever et al. |
| 8,738,457 B2 | 5/2014 | Roever et al. |
| 8,804,956 B2 | 8/2014 | Hiriart |
| 9,177,338 B2 | 11/2015 | Collins et al. |
| 9,509,704 B2 | 11/2016 | Roever et al. |
| 9,621,372 B2 | 4/2017 | Roever et al. |
| 10,073,984 B2 | 9/2018 | Roever et al. |
| 10,192,234 B2 | 1/2019 | Collins et al. |
| 10,198,719 B2 | 2/2019 | Collins et al. |
| 10,380,621 B2 | 8/2019 | Thrasher et al. |
| 10,467,606 B2 | 11/2019 | Roever et al. |
| 10,706,168 B2 | 7/2020 | Roever et al. |
| 2001/0008557 A1 | 7/2001 | Stefik et al. |
| 2001/0026287 A1 | 10/2001 | Watanbe |
| 2001/0032312 A1 | 10/2001 | Runje et al. |
| 2002/0004847 A1 | 1/2002 | Tanno |
| 2002/0026445 A1 | 2/2002 | Chica et al. |
| 2002/0029183 A1 | 3/2002 | Vlahoplus et al. |
| 2002/0032646 A1 | 3/2002 | Sweeney et al. |
| 2002/0038278 A1 | 3/2002 | Himmelstein |
| 2002/0040346 A1 | 4/2002 | Kwan |
| 2002/0048369 A1 | 4/2002 | Ginter et al. |
| 2002/0062249 A1 | 5/2002 | Iannacci |
| 2002/0082961 A1 | 6/2002 | Abrahm et al. |
| 2002/0091643 A1 | 7/2002 | Okamoto |
| 2002/0091646 A1 | 7/2002 | Lake et al. |
| 2002/0099564 A1* | 7/2002 | Kim .................. G06Q 30/02 705/1.1 |
| 2002/0106081 A1 | 8/2002 | Yang |
| 2002/0116471 A1 | 8/2002 | Shteyn |
| 2002/0128940 A1 | 9/2002 | Orrin et al. |
| 2002/0129140 A1 | 9/2002 | Peled et al. |
| 2002/0143703 A1 | 10/2002 | Razvan et al. |
| 2002/0147929 A1 | 10/2002 | Rose |
| 2002/0152126 A1 | 10/2002 | Lieu et al. |
| 2002/0152173 A1 | 10/2002 | Rudd |
| 2002/0152262 A1 | 10/2002 | Arkin et al. |
| 2002/0156743 A1 | 10/2002 | DeTrevilie |
| 2002/0178082 A1 | 11/2002 | Krause et al. |
| 2002/0184504 A1 | 12/2002 | Hughes |
| 2002/0198843 A1 | 12/2002 | Wang et al. |
| 2003/0004885 A1 | 1/2003 | Banerjee et al. |
| 2003/0023561 A1 | 1/2003 | Stefik et al. |
| 2003/0023564 A1 | 1/2003 | Padhye et al. |
| 2003/0028489 A1 | 2/2003 | Williamson |
| 2003/0046093 A1 | 3/2003 | Erickson et al. |
| 2003/0061566 A1 | 3/2003 | Rubstein et al. |
| 2003/0079122 A1 | 4/2003 | Asokan et al. |
| 2003/0084171 A1 | 5/2003 | de Jong |
| 2003/0084302 A1 | 5/2003 | de Jong |
| 2003/0093695 A1 | 5/2003 | Dutta |
| 2003/0125965 A1 | 7/2003 | Falso |
| 2003/0131048 A1 | 7/2003 | Najork |
| 2003/0140003 A1 | 7/2003 | Wang et al. |
| 2003/0140034 A1 | 7/2003 | Probst et al. |
| 2003/0159043 A1 | 8/2003 | Epstein |
| 2003/0182142 A1 | 9/2003 | Valenzuela et al. |
| 2003/0196087 A1 | 10/2003 | Stringer et al. |
| 2003/0200439 A1 | 10/2003 | Moskowitz |
| 2003/0208406 A1 | 11/2003 | Okamoto et al. |
| 2003/0217006 A1 | 11/2003 | Roever et al. |
| 2003/0220881 A1 | 11/2003 | Pirhonen et al. |
| 2003/0229593 A1 | 12/2003 | Raley |
| 2004/0003180 A1 | 1/2004 | Cypher |
| 2004/0034601 A1 | 2/2004 | Kreuzer |
| 2004/0039916 A1 | 2/2004 | Aldis et al. |
| 2004/0044627 A1* | 3/2004 | Russell ............. G06Q 20/4014 705/50 |
| 2004/0044779 A1 | 3/2004 | Lambert |
| 2004/0054630 A1 | 3/2004 | Ginter et al. |
| 2004/0054915 A1 | 3/2004 | Jong et al. |
| 2004/0059678 A1 | 3/2004 | Stefik et al. |
| 2004/0083391 A1 | 4/2004 | de Jong |
| 2004/0113792 A1 | 6/2004 | Ireland et al. |

(56) References Cited

U.S. PATENT DOCUMENTS

| | | |
|---|---|---|
| 2004/0128546 A1 | 7/2004 | Blakeley |
| 2004/0133548 A1 | 7/2004 | Fielding et al. |
| 2004/0139207 A1 | 7/2004 | de Jong |
| 2004/0153552 A1 | 8/2004 | Trossen et al. |
| 2004/0177039 A1 | 9/2004 | Pincus |
| 2004/0196981 A1 | 10/2004 | Nakano et al. |
| 2004/0199577 A1 | 10/2004 | Burd et al. |
| 2004/0221045 A1 | 11/2004 | Joosten et al. |
| 2004/0243517 A1 | 12/2004 | Hansen |
| 2004/0243819 A1 | 12/2004 | Bourne et al. |
| 2004/0249768 A1 | 12/2004 | Kontio et al. |
| 2004/0267671 A1 | 12/2004 | Nonaka et al. |
| 2004/0267673 A1 | 12/2004 | Ballard et al. |
| 2005/0004875 A1 | 1/2005 | Kontio et al. |
| 2005/0010486 A1 | 1/2005 | Pandhe |
| 2005/0027804 A1 | 2/2005 | Cahill et al. |
| 2005/0033700 A1 | 2/2005 | Vogler et al. |
| 2005/0038707 A1 | 2/2005 | Roever et al. |
| 2005/0038724 A1 | 2/2005 | Roever et al. |
| 2005/0091268 A1 | 4/2005 | Meyer et al. |
| 2005/0091545 A1 | 4/2005 | Soppera |
| 2005/0096938 A1 | 5/2005 | Slomkowski et al. |
| 2005/0138374 A1 | 6/2005 | Zheng et al. |
| 2005/0177716 A1 | 8/2005 | Ginter et al. |
| 2005/0204168 A1 | 9/2005 | Johnston et al. |
| 2005/0210254 A1 | 9/2005 | Gabryjelski et al. |
| 2005/0234860 A1 | 10/2005 | Roever et al. |
| 2005/0246193 A1 | 11/2005 | Roever et al. |
| 2005/0247777 A1 | 11/2005 | Pitroda |
| 2005/0251452 A1 | 11/2005 | Roever et al. |
| 2005/0268115 A1 | 12/2005 | Barde et al. |
| 2005/0273805 A1 | 12/2005 | Roever et al. |
| 2005/0276413 A1 | 12/2005 | Neogi |
| 2006/0036447 A1 | 2/2006 | Roever et al. |
| 2006/0036548 A1 | 2/2006 | Roever et al. |
| 2006/0059070 A1 | 3/2006 | Petruck |
| 2006/0064373 A1 | 3/2006 | Kelley |
| 2006/0080592 A1 | 4/2006 | Alves de Moura et al. |
| 2006/0136987 A1 | 6/2006 | Okuda |
| 2006/0167815 A1 | 7/2006 | Peinado et al. |
| 2006/0170759 A1 | 8/2006 | Roever et al. |
| 2006/0174350 A1 | 8/2006 | Roever et al. |
| 2006/0179003 A1 | 8/2006 | Steele et al. |
| 2006/0242074 A1 | 10/2006 | Kokkinen |
| 2006/0259422 A1 | 11/2006 | Sutton et al. |
| 2007/0016533 A1 | 1/2007 | Fujimura |
| 2007/0038630 A1 | 2/2007 | Li et al. |
| 2007/0087840 A1 | 4/2007 | Fayter et al. |
| 2007/0136694 A1 | 6/2007 | Friedman et al. |
| 2007/0147237 A1 | 6/2007 | Haddad et al. |
| 2007/0157320 A1 | 7/2007 | Collins et al. |
| 2007/0162300 A1 | 7/2007 | Roever et al. |
| 2007/0208720 A1 | 9/2007 | Probst et al. |
| 2007/0214083 A1 | 9/2007 | Jones et al. |
| 2007/0233602 A1 | 10/2007 | Zweig et al. |
| 2007/0250453 A1 | 10/2007 | Sako et al. |
| 2007/0255965 A1 | 11/2007 | McGucken |
| 2007/0286076 A1 | 12/2007 | Roever et al. |
| 2007/0286393 A1 | 12/2007 | Roever et al. |
| 2008/0067230 A1 | 3/2008 | Silverbrook et al. |
| 2008/0148056 A1 | 6/2008 | Ginter et al. |
| 2008/0205850 A1 | 8/2008 | Collins et al. |
| 2008/0235043 A1 | 9/2008 | Goulandris et al. |
| 2008/0243693 A1 | 10/2008 | Thrasher et al. |
| 2009/0070218 A1 | 3/2009 | Farmanfarmaian |
| 2009/0119500 A1 | 5/2009 | Roth et al. |
| 2009/0193249 A1 | 7/2009 | Conrado et al. |
| 2009/0193526 A1 | 7/2009 | Sweazey |
| 2009/0275402 A1 | 11/2009 | Backover et al. |
| 2009/0288012 A1 | 11/2009 | Hertel et al. |
| 2010/0161444 A1 | 6/2010 | Roever et al. |
| 2010/0162408 A1 | 6/2010 | Roever et al. |
| 2010/0257111 A1 | 10/2010 | Veugen et al. |
| 2010/0299718 A1 | 11/2010 | Roever et al. |
| 2011/0112917 A1 | 5/2011 | Driessen |
| 2011/0178861 A1 | 7/2011 | Georgi |
| 2011/0197285 A1 | 8/2011 | Ginter et al. |
| 2011/0296515 A1 | 12/2011 | Krstic et al. |
| 2012/0090018 A1 | 4/2012 | Padhye et al. |
| 2012/0198513 A1 | 8/2012 | Maida-Smith et al. |
| 2013/0036476 A1 | 2/2013 | Roever et al. |
| 2014/0019372 A1 | 1/2014 | Roever et al. |
| 2014/0236746 A1 | 8/2014 | Roever et al. |
| 2015/0026080 A1 | 1/2015 | Roever et al. |
| 2016/0048812 A1 | 2/2016 | Collins et al. |
| 2017/0083720 A1 | 3/2017 | Roever et al. |
| 2018/0019891 A1 | 1/2018 | Roever et al. |
| 2019/0138742 A1 | 5/2019 | Roever et al. |
| 2019/0295051 A1 | 9/2019 | Collins et al. |
| 2020/0151756 A1 | 5/2020 | Thrasher et al. |
| 2020/0186384 A1 | 6/2020 | Roever et al. |
| 2021/0042434 A1 | 2/2021 | Roever et al. |

FOREIGN PATENT DOCUMENTS

| | | |
|---|---|---|
| JP | 2002-140631 | 5/2002 |
| WO | WO 98/43211 | 10/1998 |
| WO | WO 01/11452 | 2/2001 |
| WO | WO 01/84906 | 11/2001 |
| WO | WO 2002/011033 | 2/2002 |
| WO | WO 03/098398 | 11/2003 |
| WO | WO 2004/038567 | 5/2004 |
| WO | WO 2005/116841 | 12/2005 |
| WO | WO 2007/033005 | 3/2007 |
| WO | WO 2007/033055 | 3/2007 |
| WO | WO 2007/078527 | 7/2007 |
| WO | WO 2007/130416 | 11/2007 |
| WO | WO 2007/130502 | 11/2007 |
| WO | WO 2013/019519 | 2/2013 |

OTHER PUBLICATIONS

U.S. Office Action dated Oct. 3, 2008 issued in U.S. Appl. No. 11/094,784.

U.S. Office Action dated Sep. 15, 2009 issued in U.S. Appl. No. 10/873,841.

U.S. Office Action dated Mar. 27, 2009 issued in U.S. Appl. No. 11/096,284.

U.S. Office Action dated Feb. 25, 2008 issued in U.S. Appl. No. 10/873,840.

U.S. Final Office Action dated Dec. 3, 2008 issued in U.S. Appl. No. 10/873,840.

U.S. Office Action dated May 28, 2009 issued in U.S. Appl. No. 10/873,840.

U.S. Office Action dated Feb. 9, 2005 issued in U.S. Appl. No. 10/232,861.

U.S. Office Action dated Jul. 27, 2005 issued in U.S. Appl. No. 10/232,861.

U.S. Office Action dated Dec. 2, 2005 issued in U.S. Appl. No. 10/232,861.

U.S. Final Office Action dated Jun. 21, 2006 issued in U.S. Appl. No. 10/232,861.

U.S. Office Action dated Nov. 30, 2006 issued in U.S. Appl. No. 10/232,861.

U.S. Final Office Action dated Jun. 14, 2007 issued in U.S. Appl. No. 10/232,861.

U.S. Office Action dated May 15, 2008 issued in U.S. Appl. No. 10/232,861.

U.S. Final Office Action dated Dec. 5, 2008 issued in U.S. Appl. No. 10/232,861.

U.S. Office Action dated Jun. 24, 2009 issued in U.S. Appl. No. 10/232,861.

U.S. Final Office Action dated Dec. 14, 2009 issued in U.S. Appl. No. 10/232,861.

U.S. Office Action dated Aug. 24, 2009 issued in U.S. Appl. No. 11/155,010.

U.S. Office Action dated May 26, 2010 issued in U.S. Appl. No. 11/155,010.

U.S. Miscellaneous Communication dated Jun. 11, 2010 issued in U.S. Appl. No. 11/155,010.

(56) References Cited

OTHER PUBLICATIONS

U.S. Office Action dated Apr. 5, 2013 issued in U.S. Appl. No. 11/155,010.
U.S. Office Action dated Dec. 18, 2013 issued in U.S. Appl. No. 11/155,010.
U.S. Final Office Action dated Jul. 23, 2014 issued in U.S. Appl. No. 11/155,010.
U.S. Office Action dated Jul. 1, 2016 issued in U.S. Appl. No. 11/155,010.
U.S. Final Office Action dated Feb. 22, 2017 issued in U.S. Appl. No. 11/155,010.
U.S. Office Action dated May 22, 2006 issued in U.S. Appl. No. 10/414,817.
U.S. Office Action dated Nov. 28, 2006 issued in U.S. Appl. No. 10/414,817.
U.S. Final Office Action dated Apr. 30, 2007 issued in U.S. Appl. No. 10/414,817.
U.S. Office Action dated Oct. 3, 2007 issued in U.S. Appl. No. 10/414,817.
U.S. Final Office Action dated Jun. 11, 2008 issued in U.S. Appl. No. 10/414,817.
U.S. Office Action dated Dec. 24, 2008 issued in U.S. Appl. No. 10/414,817.
U.S. Final Office Action dated Jun. 12, 2009 issued in U.S. Appl. No. 10/414,817.
U.S. Notice of Allowance dated Jan. 27, 2010 issued in U.S. Appl. No. 10/414,817.
U.S. Office Action dated Oct. 1, 2010 issued in U.S. Appl. No. 12/716,089.
U.S. Final Office Action dated May 18, 2011 issued in U.S. Appl. No. 12/716,089.
U.S. Office Action dated Jul. 1, 2013 issued in U.S. Appl. No. 12/716,089.
U.S. Notice of Allowance dated Feb. 5, 2014 issued in U.S. Appl. No. 12/716,089.
U.S. Office Action dated Apr. 6, 2016 issued in U.S. Appl. No. 14/245,885.
U.S. Final Office Action dated Nov. 17, 2016 issued in U.S. Appl. No. 14/245,885.
U.S. Office Action dated Jan. 10, 2018 issued in U.S. Appl. No. 14/245,885.
U.S. Office Action dated Dec. 22, 2005 issued in U.S. Appl. No. 10/414,830.
U.S. Office Action dated Feb. 7, 2007 issued in U.S. Appl. No. 10/414,380.
U.S. Office Action dated Oct. 4, 2010 issued in U.S. Appl. No. 11/679,760.
U.S. Final Office Action dated May 27, 2011 issued in U.S. Appl. No. 11/679,760.
U.S. Office Action dated Jan. 5, 2012 issued in U.S. Appl. No. 11/679,760.
U.S. Final Office Action dated Sep. 27, 2012 issued in U.S. Appl. No. 11/679,760.
U.S. Office Action dated May 20, 2013 issued in U.S. Appl. No. 11/679,760.
U.S. Final Office Action dated Feb. 26, 2014 issued in U.S. Appl. No. 11/679,760.
U.S. Office Action dated Jan. 5, 2015 issued in U.S. Appl. No. 11/679,760.
U.S. Office Action dated Jun. 9, 2015 issued in U.S. Appl. No. 11/679,760.
U.S. Final Office Action dated Jan. 11, 2016 issued in U.S. Appl. No. 11/679,760.
U.S. Office Action dated Dec. 20, 2005 issued in U.S. Appl. No. 10/440,286.
U.S. Final Office Action dated Jul. 13, 2006 issued in U.S. Appl. No. 10/440,286.
U.S. Office Action dated Jan. 30, 2007 issued in U.S. Appl. No. 10/440,286.
U.S. Final Office Action dated Jun. 28, 2007 issued in U.S. Appl. No. 10/440,286.
U.S. Office Action dated Dec. 27, 2007 issued in U.S. Appl. No. 10/440,286.
U.S. Final Office Action dated Aug. 6, 2008 issued in U.S. Appl. No. 10/440,286.
U.S. Office Action dated Nov. 18, 2008 issued in U.S. Appl. No. 10/440,286.
U.S. Final Office Action dated Feb. 11, 2009 issued in U.S. Appl. No. 10/440,286.
U.S. Advisory Action Before the Filing of an Appeal Brief dated May 28, 2009 issued in U.S. Appl. No. 10/440,286.
U.S. Notice of Allowance dated Dec. 24, 2009 issued in U.S. Appl. No. 10/440,286.
U.S. Office Action dated Jul. 13, 2011 issued in U.S. Appl. No. 12/717,007.
U.S. Office Action dated Oct. 4, 2011 issued in U.S. Appl. No. 12/717,007.
U.S. Final Office Action dated May 2, 2012 issued in U.S. Appl. No. 12/717,007.
U.S. Notice of Allowance dated Jul. 8, 2013 issued in U.S. Appl. No. 12/717,007.
U.S. Office Action dated Mar. 9, 2016 issued in U.S. Appl. No. 14/031,908.
U.S. Final Office Action dated Aug. 29, 2016 issued in U.S. Appl. No. 14/031,908.
U.S. Office Action dated Feb. 9, 2017 issued in U.S. Appl. No. 14/031,908.
U.S. Office Action dated Jan. 14, 2008 issued in U.S. Appl. No. 10/439,629.
U.S. Final Office Action dated Oct. 23, 2008 issued in U.S. Appl. No. 10/439,629.
U.S. Office Action dated Jan. 28, 2009 issued in U.S. Appl. No. 10/439,629.
U.S. Notice of Allowance dated May 10, 2010 issued in U.S. Appl. No. 10/439,629.
U.S. Office Action dated Sep. 30, 2011 issued in U.S. Appl. No. 12/850,454.
U.S. Final Office Action dated Aug. 31, 2012 issued in U.S. Appl. No. 12/850,454.
U.S. Office Action dated Sep. 23, 2014 issued in U.S. Appl. No. 12/850,454.
U.S. Final Office Action dated Mar. 6, 2015 issued in U.S. Appl. No. 12/850,454.
U.S. Office Action dated Oct. 12, 2016 issued in U.S. Appl. No. 12/850,454.
U.S. Final Office Action dated Jun. 19, 2017 issued in U.S. Appl. No. 12/850,454.
U.S. Office Action dated Sep. 13, 2018 issued in U.S. Appl. No. 12/850,454.
U.S. Office Action dated Sep. 26, 2007 issued in U.S. Appl. No. 11/118,608.
U.S. Office Action dated May 14, 2008 issued in U.S. Appl. No. 11/118,608.
U.S. Office Action dated Nov. 10, 2008 issued in U.S. Appl. No. 11/118,608.
U.S. Final Office Action dated Apr. 16, 2009 issued in U.S. Appl. No. 11/118,608.
U.S. Office Action dated Mar. 16, 2009 issued in U.S. Appl. No. 11/146,399.
U.S. Office Action dated Mar. 22, 2011 issued in U.S. Appl. No. 11/741,952.
U.S. Final Office Action dated Sep. 27, 2011 issued in U.S. Appl. No. 11/741,952.
U.S. Office Action dated Oct. 18, 2013 issued in U.S. Appl. No. 11/741,952.
U.S. Final Office Action dated May 20, 2014 issued in U.S. Appl. No. 11/741,952.
U.S. Office Action dated Sep. 5, 2014 issued in U.S. Appl. No. 11/741,952.
U.S. Final Office Action dated Feb. 18, 2015 issued in U.S. Appl. No. 11/741,952.

(56) References Cited

OTHER PUBLICATIONS

U.S. Office Action dated Aug. 11, 2015 issued in U.S. Appl. No. 11/741,952.
U.S. Final Office Action dated Dec. 21, 2015 issued in U.S. Appl. No. 11/741,952.
U.S. Notice of Allowance dated Jan. 20, 2017 issued in U.S. Appl. No. 11/741,952.
U.S. Office Action dated Oct. 27, 2017 issued in U.S. Appl. No. 15/448,473.
U.S. Office Action dated Aug. 11, 2011 issued in U.S. Appl. No. 11/742,253.
U.S. Final Office Action dated May 21, 2012 issued in U.S. Appl. No. 11/742,253.
U.S. Office Action dated Aug. 31, 2015 issued in U.S. Appl. No. 11/742,253.
U.S. Final Office Action dated Feb. 23, 2016 issued in U.S. Appl. No. 11/742,253.
U.S. Office Action dated Jan. 26, 2018 issued in U.S. Appl. No. 11/742,253.
U.S. Final Office Action dated Aug. 15, 2018 issued in U.S. Appl. No. 11/742,253.
U.S. Office Action dated Sep. 21, 2010 issued in U.S. Appl. No. 11/645,139.
U.S. Final U.S. Office Action dated May 5, 2011 issued in U.S. Appl. No. 11/645,139.
U.S. Office Action dated Nov. 7, 2014 issued in U.S. Appl. No. 11/645,139.
U.S. Notice of Allowance dated Jul. 10, 2015 issued in U.S. Appl. No. 11/645,139.
U.S. Office Action dated Dec. 29, 2016 issued in U.S. Appl. No. 14/831,713.
U.S. Final Office Action dated Jun. 15, 2017 issued in U.S. Appl. No. 14/831,713.
U.S. Notice of Allowance dated Sep. 12, 2018 issued in U.S. Appl. No. 14/831,713.
U.S. Office Action dated Nov. 29, 2010 issued in U.S. Appl. No. 11/940,747.
U.S. Final Office Action dated Aug. 23, 2011 issued in U.S. Appl. No. 11/940,747.
U.S. Office Action dated Mar. 26, 2015 issued in U.S. Appl. No. 11/940,747.
U.S. Final Office Action dated Feb. 1, 2016 issued in U.S. Appl. No. 11/940,747.
U.S. Office Action dated Dec. 29, 2016 issued in U.S. Appl. No. 11/940,747.
U.S. Final Office Action dated Oct. 6, 2017 issued in U.S. Appl. No. 11/940,747.
U.S. Notice of Allowance dated Sep. 11, 2018 issued in U.S. Appl. No. 11/940,747.
U.S. Corrected Notice of Allowance dated Sep. 25, 2018 issued in U.S. Appl. No. 11/940,747.
U.S. Office Action dated Jul. 12, 2010 issued in U.S. Appl. No. 11/940,753.
U.S. Final Office Action dated Jan. 24, 2011 issued in U.S. Appl. No. 11/940,753.
U.S. Office Action dated Nov. 7, 2014 issued in U.S. Appl. No. 11/940,753.
U.S. Final Office Action dated May 22, 2015 issued in U.S. Appl. No. 11/940,753.
U.S. Office Action dated Dec. 4, 2015 issued in U.S. Appl. No. 11/940,753.
U.S. Final Office Action dated Apr. 13, 2016 issued in U.S. Appl. No. 11/940,753.
U.S. Office Action dated Apr. 18, 2017 issued in U.S. Appl. No. 11/940,753.
U.S. Office Action dated Sep. 21, 2018 issued in U.S. Appl. No. 11/940,753.
U.S. Office Action dated May 22, 2013 issued in U.S. Appl. No. 13/558,238.
U.S. Final Office Action dated Feb. 28, 2014 issued in U.S. Appl. No. 13/558,238.
U.S. Office Action dated Nov. 5, 2014 issued in U.S. Appl. No. 13/558,238.
U.S. Final Office Action dated Feb. 24, 2015 issued in U.S. Appl. No. 13/558,238.
U.S. Office Action dated Jul. 2, 2015 issued in U.S. Appl. No. 13/558,238.
U.S. Final Office Action dated Mar. 9, 2016 issued in U.S. Appl. No. 13/558,238.
U.S. Notice of Allowance dated Sep. 19, 2016 issued in U.S. Appl. No. 13/558,238.
U.S. Office Action dated May 19, 2017 issued in U.S. Appl. No. 15/298,103.
U.S. Notice of Allowance dated Jul. 2, 2018 issued in U.S. Appl. No. 15/298,103.
PCT International Search Report and Written Opinion dated Feb. 16, 2006 issued in PCT Application No. PCT/US2005/021057.
PCT Notification Concerning Transmittal of International Preliminary Report on Patentability dated Jan. 11, 2007 issued in PCT Application No. PCT/US2005/021057.
PCT International Search Report and Written Opinion dated Nov. 25, 2003 issued in PCT Application No. PCT/US03/15614.
Chinese First Office Action dated Dec. 26, 2008 issued in CN Application No. 03 816746.8.
European Communication dated Oct. 19, 2006 issued in EP Application No. 03 72 6905.7.
European Office Action dated Oct. 27, 2008 issued in EP Application No. 03 72 6905.7.
European Office Action dated Nov. 6, 2008 issued in EP Application No. 03 72 6905.7.
European Office Action dated Apr. 9, 2010 issued in EP Application No. 03 72 6905.7.
JP Office Action dated Mar. 24, 2009 issued in JP Application No. 2004-505848.
PCT International Search Report and Written Opinion dated Sep. 16, 2008 issued in PCT/US07/10560.
PCT International Preliminary Report on Patentability and Written Opinion dated Nov. 4, 2008 issued in PCT/US07/10560.
PCT International Search Report and Written Opinion dated Dec. 7, 2007 issued in PCT/US07/010708.
PCT International Preliminary Report on Patentability and Written Opinion dated Nov. 13, 2008 issued in PCT/US2007/010708.
PCT International Search Report and Written Opinion dated Feb. 20, 2008 issued in PCT/US06/48776.
PCT International Preliminary Report on Patentability and Written Opinion dated Jul. 10, 2008 issued in PCT/US2006/048776.
European Extended Search Report dated Nov. 28, 2013 issued in EP 06 847 910.4.
PCT International Search Report and Written Opinion dated Jan. 17, 2013 issued in PCT/US2012/048182.
PCT International Preliminary Report on Patentability and Written Opinion dated Feb. 13, 2014 issued in PCT/US2012/048182.
Ahn et al. Managing privacy preferences for federated identity management, in Proc. DIM '05: Proceedings of the 2005 workshop on Digital identity management, Fairfax, VA, USA, 2005, pp. 28-36.
Alladin/Preview Systems, HASP SL, Alladin/Preview Systems, 2004.
Bohrer, K. and Holland, B. "Customer Profile Exchange (CPExchange) Specification", *International Digital Enterprise Alliance, Inc.*, Version 1.0, Oct. 20, 2000.
Burdett, D. RFC 2801: Internet Open Trading Protocol, [Online]. Apr. 2000. Available: http://www.faqs.org/rfcsl rfc2801.html.
Business.com, Preview Systems, Inc. Profile, [Online]. 2006. Available: http://www.business.com/directory/telecommunicationslpreview_systems_inc/profile/.
Cobèna, (2003) "Thèse d'Informatique, spècialitè Algorithmique, Change Management of Semi-Structure Data on the Web", soutenue le Jun. 26, 2003 par, *Ecole Doctorale de l'Ecole Polytechnique*, 228 pages.

(56) References Cited

OTHER PUBLICATIONS

Cox B., Tygar J., Sirbu M., "Netbill Security and Transaction Protocol." First USENIX Workshop on Electronic Commerce, Jul. 1995.

Fielding, (Jan. 2000) "Architectural Styles and the Design of Network-based Software Architectures", University of California, Irvine, Dissertation, 90 pages.

FlexTicket. [Online] Available: http://info.isl.ntt.co.jp/flexticket/index.html, Last Modified Dec. 25, 2001.

Fujimura et al. XML Ticket: Generalized Digital Ticket Definition Language, 1999.

Fujimura et al. "A Worldwide Supermarket Scheme Using Rights Trading System", in Proc. ICPADS '00: Proceedings of the Seventh International Conference on Parallel and Distributed Systems: Workshops, Washington, DC, USA 2000, p. 289.

Fujimura et al. "General Purpose Digital Ticket Framework", Boston, MA: 3rd USENIX Workshop on Electronic Commerce, 1998.

Fujimura et al., "Digital Ticket Controlled Digital Ticket Circulation", USENIX, 1999.

Fujimura, K. and Eastlake, D., RFC 3506: Requirements and Design for Voucher Trading System [VTS], United States: Network Working Group, Mar. 2003, [online] Available at http://rfc.net/rfc3506.html.

Haller et al., (May 1996) "A One-Time Password System", *Kaman Sciences Corporation, Network Working Group*, Request for Comments 1938, Category: Standards Track, 18 pp.

Hardjono, T. and Seberry, J., "Strongboxes for Electronic Commerce", Oakland, CA: 2nd USENIX Workshop on Electronic Commerce, 1996.

Hettinga, UNDRs and Bearer "other stuff" besides cash [was Re: ESIGN Act], http://legalminds.Jp.findlaw.com/list/cyberia-1/msg:31650.html, May 29, 2001.

IETF Internet Open Trading Protocol Working Group Publishes RFC for Voucher Trading System, Cover Pages. [Online]. May 2003. Available: http://xml.coverpages.org/ni2003-05-15-a.html.

Iguchi et al. Voucher Integrated C2B and C2C Trading Model. May 2002 [Online]. Available: http://wwwconf.ecs.soton.ac.uk/archive/00000272/01/index.html.

Internet Open Trading Protocol, Cover Pages. [Online] Dec. 2002, Available: http://xml.coverpages.org/otp.html.

Josang et al. "Trust Requirements in Identity Management." Australian Information Security Workshop, 2005.

Kumar et al. Sales Promotions on the Internet, Boston, MA: 3rd USENIX Workshop on Electronic Commerce, 1998.

Kuno et al., "A Digital Ticket Circulation Architecture, 58th Conference Collected Papers (4)", *Information Processing Society of Japan*, Japan, Mar. 11, 1999, pp. 4-295-4-296.

Lamport, "Password Authentication with Insecure Communication", Communications of the ACM, Nov. 1981, vol. 24, No. 11, pp. 770-772.

Manasse ("Why Rights Management is Wrong (and What to Do Instead)", SRC Technical Note, Compaq System Research Center, Jan. 21, 2001, 7 pages).

Matsuyama et al., "Distributed digital-ticket management for rights trading system", in Proc. EC '99: Proceedings of the 1st ACM conference on Electronic commerce, Denver, Colorado, United States, 1999, pp. 110-118.

Medvinsky, G. and Neuman, B.C., "NetCash: A design for practical electronic currency on the Internet", *Proceedings of the First ACM Conference on Computer and Communications Security*, Nov. 1993.

Menezes et al., Handbook of Applied Cryptography, 1997 CRC Press LLC, Section 1.7.

Miller, Mark S. and Shapiro, Jonathan S. (2003) "Paradigm Regained: Abstraction Mechanisms for Access Control," *HP Laboratories*, Palo Alto, HPL-2003-222, 22 pages; to be published in and presented at ASIAN'03, Dec. 10-13, 2003, Mumbai, India [Downloaded on Jul. 12, 2017 from http://www.hpl.hp.com/techreports/2003/HPL-2003-222].

Mont et al., "Towards Accountable Management of Identity and Privacy: Sticky Policies and Enforceable Tracing Services", Hewlett Packard, 2003.

OECD (Jan. 27, 2006) OECD Guidelines on the Protection of Privacy and Transborder Flows of Personal Data [br], [online]. Available: http://www.oecd.org/document/18/0.2340, en_2649_201185_1815186_1_1_1_1.00.

Rahn, http://www.nettime.org/Lists-Archives/nettime-1-0009/msg00214.html, Sep. 22, 2000.

Skinner et al., "A Framework of privacy shield in organizational information systems," *Proceedings of Int'l Conference on Mobile Business*, 2005.

Software Requirements Specification for <Project> template, Version 1.1 approved, Copyright © 2002 by Karl E. Wiegers, section 2.4, Operating Environments, downloaded from www.processimpact.com, 8 pp.

Stewart, "The Future of Digital Cash on the Internet", [online] Available: http://www.arraydev.com/commerce/JIBC/9703-02.htm, printed Jan. 26, 2006.

Szabo, "Contracts with Bearer" http://szabo.best.vwh.net/bearer_contracts.html, 12 pages [1997].

Terada et al. "Copy Prevention Scheme for Rights Trading Infrastucture", 2000.

Terada et al., RFC 4153: "XML Voucher: Generic Voucher Language", Network Working Group, Sep. 2005.

Terada et al., RFC 4154: Voucher Trading System Application Programming Interface, Sep. 2005 [online] Available: http://www.rfc-archive.org/getrfc.php?rfc=4154.

"The OAuth 2.0 Authorization Protocol", (Abstract) draft-ietf-oauth-v2-28, *Network Working Group, E. Hammer, Ed.*, Jun. 19, 2012, 48 pages.

The UNIX Operating System: Mature, Standardized and State-of-the-Art, White Paper issued in August of 1997 downloaded on Sep. 21, 2011 from http://www.unix.org/whitepapers/wp-0897.html, 4 pp.

Tilkov, Stefan, "A Brief Introduction to REST", posted on Dec. 10, 2007 at http://www.infoq.com/articles/rest-introduction, 10 pages.

"US Navy: Military Exchanges now offer best price guarantee," M2 Presswire, Conventry, Jun. 4, 1998, p. 1 [recovered from Proquest May 17, 2006].

Weitzel, "Liberty ID-WSF Implementation Guide," Liberty Alliance Project, Jan. 1, 2005.

Wikipedia—Hash Chain: http://en.wikipedia.org/wiki/Hash_chain, downloaded Feb. 27, 2011.

XML Voucher: Generic Voucher Language, Cover Pages [Online] May 2003, Available: http://xml.coverpages.org/xmlVoucher.html.

U.S. Appl. No. 16/100,658, filed Aug. 10, 2018, Roever et al.

U.S. Final Office Action dated Jun. 27, 2019 issued in U.S. Appl. No. 12/850,454.

U.S. Office Action dated Jan. 2, 2019 issued in U.S. Appl. No. 12/850,454.

U.S. Final Office Action dated Oct. 3, 2019 issued in U.S. Appl. No. 12/850,454.

U.S. Final Office Action dated Jun. 5, 2018 issued in U.S. Appl. No. 15/448,473.

U.S. Examiner's Answer to Appeal Brief (filed Jan. 23, 2019) Before the Patent Trial and Appeal Board on Apr. 17, 2019 issued in U.S. Appl. No. 15/448,473.

U.S. Office Action dated Jul. 8, 2019 issued in U.S. Appl. No. 15/448,473.

U.S. Final Office Action dated Apr. 2, 2020 issued in U.S. Appl. No. 15/448,473.

U.S. Notice of Allowance dated Jul. 8, 2019 issued in U.S. Appl. No. 11/742,253.

U.S. Notice of Allowance dated May 1, 2019 issued in U.S. Appl. No. 11/940,753.

U.S. Office Action dated Oct. 21, 2019 issued in U.S. Appl. No. 16/100,658.

U.S. Notice of Allowance dated Mar. 19, 2020 issued in U.S. Appl. No. 16/100,658.

U.S. Corrected Notice of Allowance dated May 7, 2020 issued in U.S. Appl. No. 16/100,658.

U.S. Appl. No. 16/946,018, filed Jun. 2, 2020, Roever et al.

(56) References Cited

OTHER PUBLICATIONS

U.S. Office Action dated Dec. 15, 2020 issued in U.S. Appl. No. 12/850,454.
U.S. Office Action dated Oct. 13, 2020 issued in U.S. Appl. No. 15/448,473.
U.S. Notice of Allowance dated Feb. 25, 2021 issued in U.S. Appl. No. 15/448,473.
U.S. Office Action dated Jan. 25, 2021 issued in U.S. Appl. No. 16/452,227.

* cited by examiner

METHODS AND MEDIUM FOR TITLE MATERIALS EMBEDDED WITHIN MEDIA FORMATS AND RELATED APPLICATIONS

1 CROSS REFERENCE TO RELATED U.S. PATENT APPLICATIONS

This application is a continuation of and claims priority under 35 U.S.C. 120 to U.S. patent application Ser. No. 11/940,747 filed on Nov. 15, 2007, which claims priority under 35 U.S.C. 119(e) to U.S. Provisional Patent Application No. 60/865,983 filed on Nov. 15, 2006, the entire disclosure of each of which is incorporated herein by reference for all purposes.

This application is also related to U.S. patent application Ser. No. 11/742,253 filed on Apr. 30, 2007, the entire disclosure of which is incorporated herein by reference for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2007, Navio Systems Inc.

3 BACKGROUND OF THE INVENTION

3.1 Field of the Invention

The present invention provides systems, methods, and software for embedding and using title materials in digital commerce which represent digital bearer instruments that express at least one right, such as those produced commercially by Navio Systems Inc. of Cupertino, Calif.

3.2 The Related Art 3.2.1 Overview

Advertising is an important aspect of modern communications, whatever their form, especially on the Internet. Many "free" services are supported by advertising revenue and many businesses locate and sell their customers through web sites and the advertisements that guide customers to them. Initial advertising takes multiple forms, both electronic, and otherwise.

One form of Internet web advertising practice involves the placement of advertisements on web pages. These advertisements generally include digital media of various sorts (e.g. static, animated, or movies), occasionally include sounds, and often include associated scripts that are activated when a user "mouses over" or otherwise indicates interest in the advertisement. The image is often used the enticement for the user to click on a link to the advertiser's web site; a practice known as "click through". When this is not the case, the associated script software can perform a similar function, or it can interact with the user to collect information and send this to the advertiser's systems or act as a conduit to the advertiser's systems for purposes of collecting user information, expanding on the offer being advertised, accepting a purchase order or for other purposes.

Transactional advertisements are advertisements that permit a user to take advantage of the advertised offer when they "click-through".

FIG. 1 illustrates a typical prior art advertisement on a web page. This type of advertisement is a "click-through" that takes the user to the advertiser's web site, and does not convey any rights. There are a number of issues that result from this model of Internet web advertising, many of which interfere with the effectiveness of the advertising. In general, these issues can include:

users disabling the required technologies to prevent their misuse by harmful software programs, incompatibilities between the digital media and the user's system, the need for the advertiser's web site to be available and accessible by the user's system (which may be problematic due to firewalls, content filters or other factors), the user being willing to take the time to act on the advertisement at the time it is viewed, since there is no easy way to save such advertisements to be acted on at a later time, and the user being able to recognize that the encoded offer is the same as the offer displayed in the advertisement.

Additionally, in situations where the advertisement that is presented is chosen dynamically by advertising placement software, the user may not be able to return to the same advertisement at a later time, since returning to the same web site again may result in a different advertisement being displayed.

Another form of Internet advertising involves sending e-mail with offers and links to associated web pages. These offers may include digital media of various sorts, or be limited to simple or formatted text, but usually include URL or a link that can be followed with a web browser to reach the advertiser's web site. This form of advertising has all of the issues described above for web page advertisements except for the ability to delay dealing with the advertisement, but with the additional problem that criminal use of e-mail for purposes of collecting private information or transmitting harmful software is common, and thus users are hesitant to follow links sent in e-mail, even when the e-mail purports to be from known organizations or businesses.

What are needed are technologies that can be used, when combined with trusted transaction systems such as the Digital Commerce System provided by Navio Systems Inc. to produce a transactional advertising system that is effective to create and fulfill advertisements that are not characterized by at least some of these issues. Such technologies are described in the following sections.

3.2.2 Title Materials

A title is a digital bearer instrument that expresses at least one right. A digital bearer instrument is a digital representation of a bearer instrument, e.g. one that can be redeemed by the bearer without requiring further identification, authentication, or proof of ownership. Digital bearer instruments were originally developed for use with digital cash and related cash-transaction technologies. Titles employed by specific embodiments of the present invention are related to the title technologies provided by Navio Systems Inc. of Cupertino Calif. Title materials include titles, portions of titles, for example, such as a specific right definition, a reference to a specific title or right, and independently validatable portions of titles. A stub is one example of an independently validatable portion of a title. Title materials, as used herein, may also include specific instances of digital bearer instruments that may not include a specific right. Titles are presented to title-enabled processes, computers, and devices, which use a presented title to operate on and/or facilitate redemption of rights expressed by such title.

3.2.3 Title Processing Arrangements

Title technology, including various title processing arrangements, is described in U.S. patent application Ser. No. 11/742,253, filed Apr. 30, 2007, titled "Enhanced Title Processing Arrangement," and U.S. patent application Ser. No. 10/439,629, filed May 15, 2003, titled "Methods and Apparatus for Title Protocol, Authentication, and Sharing," the entire disclosures of both of which are incorporated herein by reference for all purposes. Such arrangements are effective for processing title materials.

3.2.4 Well-Known Media Formats

Media formats are formal or de facto standards for the digital representation of still or moving images, graphics, photographs, drawings, text, sound or combinations of any or all of these. In some cases, provision for associated copyright, display/replay control, use restriction, and other data related to the media data is incorporated into the format design. The digital representation may be stored using methods which preserve the integrity of the original media data, or methods which degrade the media data in various ways, such as loss of color accuracy, loss of resolution, loss of original rendering information, or others, for various purposes, such as reducing storage requirements, speeding display, or for aesthetic effect.

Some media format designs include provision for extending the format design so as to include new capabilities in ways that do not interfere with use of such formats by software that predates or is otherwise non-supportive of the format extensions. Such format designs are referred to herein as "extensible formats". Some media format designs include features which may be used for purposes other than those originally intended. For example, a format design may include a field intended to be used for comments describing the associated media content, but since software that displays the media has no dependency on the exact content of this field, it can be used to encode other information without interfering with use by software that does not support the new information. Such format designs are referred to herein as "re-purposeable formats". Some media format designs include features which permit software that supports such formats to identify which parts of the media specify data, and which do not. It is possible in some such cases to add additional information to such formats, in areas that are not included in the media data areas and which are therefore ignored by software that supports such formats. Formats with this characteristic are referred to herein as "appendable formats".

Media format designs use various methods for organizing data. Some of the simpler designs start with some fixed descriptive information (a "header"), with the remainder of the data being media data. Some of these designs, such as the BMP format, include information in the header that indicate the areas of the file that include image data, and may include information that indicates areas for other data, such as color information. Such formats are seldom extensible, but may be re-purposeable or appendable. Other, more complex designs, use a method known as "tagging", where a file includes a series of data blocks, each of which is organized in the same way, with recognized marker data (a "tag") being located in a specific part of each data block. Different blocks may have different sizes and purposes, or varying internal organizations so long as the required tag can be located. The format design usually does not specify how many blocks a media file can contain, or the order required (except perhaps for a required first "header" block that identifies the file format used), and software is generally written to ignore any blocks tagged with tags the software does not recognize. Some tagged format designs specify particular tags that may be used to extend the capabilities of the format. Others use tags with less restrictive layouts which enable a nearly infinite number of potential tags to be added.

For historical, technical, and other reasons, there are many media formats in common use. Common practice or standards organizations have assigned particular file name suffixes to these, which can be used by users and software to gain some idea as to the format design used by a file without having to examine its contents. When files are sent in e-mail or used on web pages, standard MIME (Multimedia Internet Mail Extension) descriptions exist for many format designs that are used to specify the format used by the associated media file. Examples of standard media formats include Graphics Interchange Format (GIF), Portable Network Graphics (PNG), JPEG, "MPEG-1, Audio Layer 3" (MP3), "Advanced Audio Coding MPEG-4" (AAC MP4), and "Flash" (SWF).

GIF, version 89a, is a bit-mapped image format widely used on the Internet. Options include "progressive display" in which the rendering exploits interlaced lines, permitting recognizable images to appear before the whole file has downloaded; and short animations that exploit multiple images and control data within a single file. GIF89a is a de facto standard and was developed by CompuServe. It is described at http://www.w3.org/Graphics/GIF/spec-gif89 a.txt.

The PNG specification defines both a datastream and an associated file format for a lossless, portable, compressed, raster (bit-mapped) image. PNG is fully streamable with a progressive display option. Indexed color, grayscale, and RGB color (referred to as truecolor in the specification) are supported, with optional transparency (alpha channel). PNG can store data for accurate color matching. The PNG format was originally designed as an open standard to replace GIF 89a for use on the Internet, but is not limited to that use. The PNG standard is described in ISO/IEC 15948.

MP3 is a bit stream encoding format for sound, initially designed for efficient distribution of music files of adequate listening quality over moderate bandwidth connections. It provides a representation of audio in much less space than straightforward methods, by using psychoacoustic models to discard components less audible to human hearing, and recording the remaining information in an efficient manner. Similar principles are used by JPEG, a "lossy" image compression format. The three classes of audio compression associated with the MPEG moving image specifications are known as Layers I, II, and III, with the latter being MP3. The standard for MP3 is described in ISO/IEC 11172-3.

Advanced Audio Coding MPEG-4 (AAC MP4) is a perceptual audio encoding format designed for efficient distribution of sound files over moderate bandwidth connections, but may be used at higher data rates for better fidelity. A variant of AAC MP4 is AAC MP4 Version 2, which has both audio and visual coding. The standard for MP4 is described in ISO/IEC 14496-14.

The Flash (SWF) file format was designed to deliver media content through the Internet. SWF is used for on-screen display and supports features to support this, such as anti-aliasing, rendering using any color formats, animation and user interaction methods. SWF was designed to be extended with new features while maintaining compatibility with display software which pre-dates them. SWF files can be delivered over a network with limited and unpredictable bandwidth. The files are compressed to be small and support incremental rendering through streaming. The Flash format is a proprietary format developed by Macromedia and currently owned by Adobe Systems, Inc.

While some media formats include features which support reference to copyright holders, distribution region restrictions, or other kinds of digital rights support, these do not include explicit support for digital bearer instruments, rights as supported by titles, title fragments or title references, or the ownership transfer and reproduction features needed to enable digital commerce in such digital formats. What is lacking is a mechanism to make media immediately purchasable and to represent rights within a media file.

3.2.5 XML

The eXtensible Markup Language is a specification for a syntax that allows the creation of markup languages for purposes of describing data. XML is a flexible text format derived from SGML (ISO 8879). XML is playing an increasingly important role in the exchange of a wide variety of data on the Web and elsewhere, and is a recommendation of the World Wide Web Consortium (W3C) which publishes various descriptions of XML and supports various working groups that develop the language. XML is inherently extensible to accommodate new kinds of data in media which use it.

3.2.6 RSS Feeds

Really Simple Syndication (or, alternatively, Rich Site Summary) (RSS) is a lightweight multipurpose extensible metadata description and syndication format. RSS is an XML application, conforms to the W3C's Resource Description Framework (RDF) specification and is extensible via XML. Initially, RSS feeds were intended for distribution of news headlines, often collected from various sources and filtered to concentrate on specific areas of interest, such as stocks, science, or entertainment. The usage has expanded to a great diversity of uses including, for example, forum headlines, new auction listings, updated listings of houses for sale, complete audio programs, and a number of other uses. Feeds can be distributed by a single source, or can be distributed to multiple locations, which further distribute the feeds. Feeds can be viewed online using a site such as my yahoo, or by downloading feed reading software. Some portable devices have the capability to accept downloads of RSS feeds for later use with appropriate software. An example of such a device is the Apple i-Pod. The specifications for RSS are located at http://www.rss-specifications.com/. RSS 2.0 is offered by the Berkman Center for Internet & Society at Harvard Law School under the terms of the Attribution/Share Alike Creative Commons license.

3.2.7 HTML and XHTML

Hypertext Markup Language, and it's successor, eXtended Hypertext Markup Language, are the languages used to build web pages. A web page is a document made up according to the rules of HTML or XHTML. Both languages include features that can be used to extend the capabilities of web pages as new technologies are developed. Both are tag-based languages, where a document is composed of text and various "tags" which describe what the text means (text, links to other pages, URLs of images to display, page formatting information such as tables, frames, etc.), how it should be displayed (font, color, location, etc.), the version of the language specification the document complies with, and other relevant information.

3.2.8 E-Mail and MIME

Internet e-mail is based on a standard protocol known as Simple Mail Transport Protocol (SMTP). SMTP was created to allow exchange of text-based messages, with basic data such as the sender address, intended recipient address, subject and date/time of the message included in a manner that allowed software to locate and act on it. The content of the body of the message was not specified, though some restrictions on formatting, such as byte values allowed or maximum line length, were coded into some software that implemented SMTP.

To allow sending of information other than text in e-mail, a new protocol was specified for use in e-mail messages: Multimedia Internet Mail Extensions (MIME). MIME allows the inclusion of images, sound, graphics, executable programs, scripts, and many other items in mail messages which can still be sent through a standard SMTP mail system. Data which does not fit the requirements of SMTP is encoded into forms that are acceptable to SMTP and unencoded once received, with the type of item the data represents being identified by MIME. MIME types are standardized, but the standards are extensible since the type names are just strings of characters. Most MIME-aware software will ignore any MIME type that is not recognized, which limits problems with older software when a new MIME type is defined.

MIME has been adopted for use with HTML, and may be used to identify the type of object referred to by an HTML <object> tag, thus permitting new objects to be specified as needed in web pages.

3.2.9 Advertising Systems

A number of different advertising methods and systems have been developed as the Internet has grown and gained acceptance by the general public. Some methods involve advertisements placed on web sites owned by the advertiser, while other methods involve placement on web pages belonging to others, with payment for the use of the space being made based on various factors, such as number of visitors to the site, number of visitors who "click through" on the advertisement, etc. In some cases, the space may be arranged for by an ad placement company, which inserts different advertisements, from their various clients, into the space for different visitors or at different times. In addition to web page ads, advertisements may also be delivered in RSS feeds, as part of program content in downloaded audio or video programs, or in e-mail. In e-mail the advertisement may comprise the content of the message, or it may be inserted into the message or appended to the end. In most cases, any viewer who wants to take advantage of the offer described by the advertisement must follow a link to the advertiser's web site and interact with that system. Further details of several current technologies for Internet advertising are covered in the following paragraphs.

An example advertising service and method is described in Addante. According to Addante, in published patent application US2001/0036182, a content server receives a request for content from a user computer and responds by transmitting content pages with space for one or two advertisements and a referral command to a direct connect server. The user computer follows the referral command and requests an advertisement from a direct connect server. The direct connect server receives advertising selection criteria and generates and transmits a request for an advertisement to an advertisement selection server. A creative selection server identifies one or more advertisements and sends the location of the advertisements media files to the user computer. The user computer then downloads and displays the advertisement media files to the user.

According to Hamel, in published patent application US2002/0007393, an improved proxy allows click-throughs on an ad URL delivered on a web page within a Java® applet executing on a client machine. The proxy caches cookie information for the browser, to support Java applications that do not allow for placing of cookies directly. When the user clicks on the ad URL, the proxy retrieves the relevant cookie and link information from a host side database, and uses the cookie and link information to help the browser open the correct URL associated with the ad. Additional controls are provided for the proxy, including the ability to filter ads in an appropriate fashion for the applet, to cache ads from third party servers, to monitor applet behavior, to cache/pass on client IP address information, and to perform administrative tasks for the applet within the browser to enhance and facilitate ad delivery between advertisers and their intended audiences. Thus, the proxy acts to extend the reach and access of a conventional applet beyond the resources of a download host associated with such applet. In another embodiment, the applet controls a hidden frame within the browser, which hidden frame, unlike the applet frame, is able to download and plant a cookie from an ad server within the browser. When the user clicks on the ad URL, the browser uses the cookie from the hidden frame and passes it on to the ad server along with the URL, so that the user experiences a seamless and smooth transfer, as would occur from a conventional HTML tag within the page.

According to Auxler et. al. in U.S. Pat. No. 6,379,251, a system and method for increasing click-through rates of Internet banner advertisements is enabled through the delivery of banner ads having a user interactive gaming function. In one embodiment, the user interactive gaming function is implemented as an Internet scratch-off game. Further, the gaming on the banner ad is completed by interaction by the user at a merchant web site. A transfer to the merchant's web site is accomplished by using a uniform resource locator (URL) request that includes game state information. Automatic transfers to a merchant web site also can be effected based upon indications of user interaction with an interactive portion of a banner ad.

Current methods of on-line advertising tie together offers, ads, and the advertiser or offeror's web site. Consumers who wish to take advantage of one or more rights must act on the ad when is it presented to them, be willing and able to interact with the required web site, and must usually establish an account or other relationship with the offeror. They can not accept the offer anonymously, or save it for a later time and if the offeror or advertiser's web site is not accessible at the time, or uses technologies that the consumer does not have or has restricted for various reasons, the consumer will not be able to respond to the advertisement.

With the growing prevalence of security hazards on the Internet, many consumers are hesitant to interact with unfamiliar web sites or to allow certain technologies, such as Active-X, which require software to be downloaded from web sites and run locally, to be used on their systems. Many businesses, ISPs and consumers are using firewall software, security screening proxy servers, browser settings and other forms of security to restrict what kinds of interaction are allowed outside of their own intranets. This can disrupt the functioning of ads which rely on methods that are blocked by such software. Examples of ad technologies which can be blocked by security software include Active-X, Java, Flash, HTML Object Tags, and JavaScript. Some consumers also restrict browser access to data which comes from outside the domain of the web page they are viewing, which can prevent viewing of ads which are linked to from an advertiser's web site.

What is needed is an actionable ad and actionable content that can be acted on independent of the advertiser's or offeror's web site, which can be acted on in an anonymous way, or which can be acted on at a later time. Such capabilities exist in the case of printed coupons, where a manufacturer grants a discount for the purchase of their products to anyone bearing the coupon, and the coupon is redeemable at any stores which sell the manufacturer's products, at any time prior to the expiration of the coupon, but such capability does not currently exist for electronic transactions such as those done over the Internet. In addition, the actionable ads and actionable content must be in a form which is trusted, and which can be served from web sites the consumer trusts, to limit interference from security software or browser settings.

Each of the techniques of providing and servicing advertising materials to users described above are characterized by an inability to securely process an advertisement on behalf of a user and to securely transmit the results of such processing to a merchant web site. What is needed is a system that enables the secure user verification of offers, secure local processing of offers, and secure transmission and fulfillment of locally provided transaction results.

3.2.10 Existing Methods for Recognizing Digital Materials

There is no standard method for recognizing digital materials; however a number of methods are commonly used in various environments. Some digital formats include specific sequences of data bytes at particular locations within the media, others do not. This method is not perfect, since it is possible that these sequences could occur at the same location within media which are not of the media type in question. Some formats specify, or commonly have applied, particular suffixes ("filename extensions") to their containers, such as .GIF, .JPEG, .SWF or .MP3. This can be a clue, but there are generally no restrictions against using these filename extensions for other types of files, enabling users to use them for text files, other types of media files, or even executable programs. It is possible that some operating systems might not support the concept of a filename extension, or may use a media type's extension for some other purpose. Other operating systems may use the filename extension to determine which program to execute when the media container is accessed.

When a program is expecting a particular media file type, such as an MP3 player expecting files given to it to be MP3 audio files, or an image display program is expecting to be given an image file, the problem can often be dealt with by reading the file and checking for characteristics of the expected format within it. For instance, checking for a specified sequence of bytes at a specified location within the file, or checking for "reasonableness" in the data it finds. For instance, if a file format specifies a sequence of blocks, each of which has an offset to the start of the next block, and each block starts with a "tag" field which is one of a specified set of tags, then reading the file and finding such tagged blocks linking to each other would lend support to the file being of the expected type, while offsets that lead to non-existent bytes, or to blocks with unrecognized tags would indicate that the file is not of the expected format. This method is useful for verification that a file is of a particular type, but less useful for determining what type a file is in general, as each possible type would have to be checked until the file type was identified. When no better method is available, this approach can be used however.

In some cases there may be identifying data supplied external to the particular digital materials. For example, when digital materials are sent as e-mail "attachments", the enclosing e-mail message will identify the enclosure using Multipurpose Internet Mail Extensions (MIME), or a web page may identify the digital materials using the parameters of an "object tag".

While watermarking and other mechanisms exist for embedding materials within existing content stored in specific media formats, there is no current mechanism to embed offers, proofs of purchase, and other related materials within these formats. Additionally, there is no mechanism in place for accessing offers, proofs of purchase, and other related materials embedded within content stored in specific media formats and for subsequently exercising the rights represented by these offers, proofs of purchase, and similar items.

4 SUMMARY OF THE INVENTION

The present invention provides methods and apparatus for enabling actionable ads and actionable content through the use of title materials (e.g., titles, title fragments, title templates, etc.) embedded in digital media.

According to one class of embodiments, methods and apparatus are provided for facilitating a transaction involving redemption of a right represented by a digital bearer instrument. Presentation of a representation of digital content to a user is facilitated. The representation of digital content is derived from a digital object characterized by a media format. The digital object has title materials embedded therein corresponding to the digital bearer instrument. The title materials are embedded in the digital object such that processing of the digital object by a process configured to recognize the media format is not inhibited even where the process is unable to recognize the title materials. The title materials are configured such that interaction with the representation of the digital content by the user results in initiation of the transaction.

According to another class of embodiments, methods and apparatus are provided for facilitating a transaction involving redemption of a right represented by a digital bearer instrument. Title materials corresponding to the digital bearer instrument are embedded in a digital object characterized by a media format such that processing of the digital object by a process configured to recognize the media format is not inhibited even where the process is unable to recognize the title materials. The digital object corresponds to digital content and is configured to enable presentation of a representation of the digital content. Redemption of the right is facilitated in response to interaction by a user with the representation of the digital content.

According to yet another class of embodiments, a computer-readable medium is provided having a digital object stored therein. The digital object corresponds to digital content and is configured in accordance with a media format to enable presentation of a representation of the digital content. The digital object further has title materials embedded therein corresponding to a digital bearer instrument representing a right. The title materials are embedded in the digital object such that processing of the digital object by a process configured to recognize the media format is not inhibited even where the process is unable to recognize the title materials. The title materials are configured such that interaction with the representation of the digital content by a user results in initiation of a transaction involving redemption of the right.

According to various and more specific embodiments, title materials may be embedded in a digital object in a variety of ways. According to one approach, in which the media format is extensible, the title materials are embedded in an extension to the digital object. According to another approach in which the media format includes a feature characterized by a first purpose unrelated to the title materials, title materials are embedded in the digital object using the feature. According to yet another approach in which the media format defines an end of a file, the title materials are embedded in the digital object by appending the title materials to the end of the file of the digital object.

The details of one or more embodiments of the invention are set forth in the accompanying drawings and the description below. Other features and advantages of the invention will be apparent from the description and drawings, and from the claims.

5 BRIEF DESCRIPTION OF THE DRAWINGS

6 DESCRIPTION OF SPECIFIC EMBODIMENTS OF THE INVENTION

Figure 1:
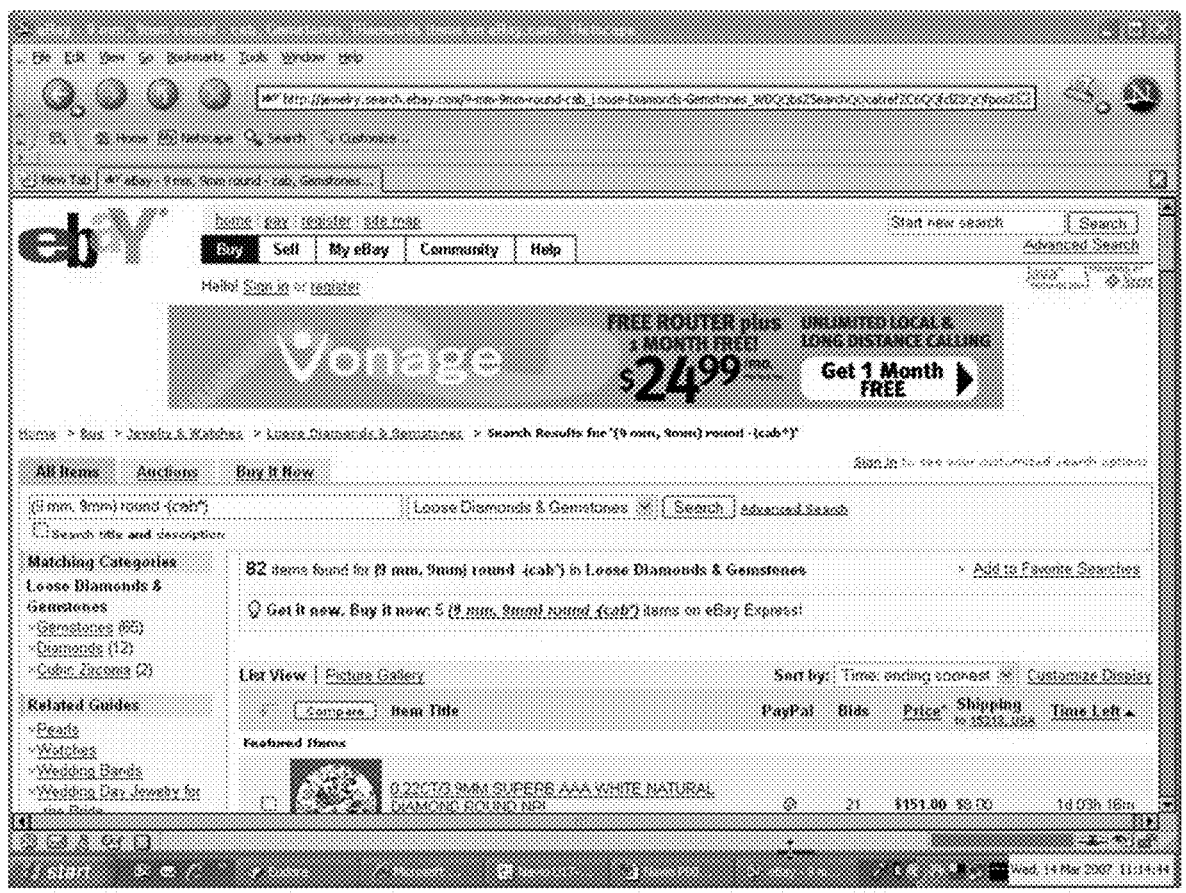
FIG. 1 illustrates a typical prior art advertisement on a web page.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

6.1 Definitions

The following definitions are used throughout, unless specifically indicated otherwise:

| | |
|---|---|
| Content structure | A data structure used to store content, including content file formats such as JPEG, GIF, MP3, and structured data formats such as RSS and HTML. |
| Embedded | A software representation that is stored within a software container, in such a manner that the software representation may be uniquely identified and optionally removed. |
| Encoded within | A software representation that is stored within a software container, in such a manner that the software representation may be uniquely identified but it cannot be removed, e.g., a digital watermark. |
| Stream | A sequence of bits. |
| Stream content | A sequence of bits that comprise one or more pieces of content. |
| W3C | The World Wide Web Consortium. |

6.2 Overview

An example of a solution that can address the deficiencies in the current systems and methods of providing advertisements is based on the use of title materials to produce title-enabled advertisements. Advertisements which are composed, at least in part, of digital media that contains embedded title materials can be:

- acted upon by a user invoking one or more rights conveyed by use of those title materials,
- trusted by said user as to source and the result of invoking said right(s),
- provide authenticatable source for referrals
- provide "save now, use later" functionality while retaining all of the above functions Invocation of rights specified by title materials may be done by way of a Digital Commerce System that the consumer already has a trusted relationship with, using client software that the consumer already owns and knows to be safe to use. There is no requirement to follow links to unknown web sites, to provide personal information to unknown parties, to execute unknown offers, or to download and run untested and potentially harmful software. Transactions can be done anonymously or non-anonymously as desired. Title materials can be embedded in most digital materials, which allows for advertisements to be done by way of still images, movies, audio, HTML pages, formatted text, programs, or others, or any combination of these. The mode of transfer of the advertisement can be through all standard advertising methods, such as web site banner ads, web site links, e-mail, file downloads, Peer-to-Peer file sharing, etc.

The use of title materials allows the originator of the advertisement to "sign" their advertisement, so that the advertisement's origin, any offers that are part of the title materials, the referring advertising site, along with other information and rights, can be known by all. This improves a user's trust that the contents are non-harmful in cases where this might be a concern, such as when distributing software as part of an advertisement. By specifying a right to copy as part of the title materials, an advertiser can permit consumers to duplicate the advertisement, optionally endorse it, and share it with others, thus increasing the audience size and reach of the advertisement, while retaining the historical information. Such rights can be limited in various ways so that the advertiser maintains control over the campaign, which can be important in, for example, cases where the advertisement includes a right to something of value, such as a free item or coupon for a discount, or where the offer has an expiration date.

An aspect of the use of title materials in these ways is the ability to embed title materials into digital media in such a way that the title materials are a part of the digital media and are accessible by title-aware software, but do not interfere with normal use of that media by software that is not title-aware, such as pre-existing media players, operating system file utilities, etc. Methods for accomplishing this are described in the following sections. These technologies are additionally advantageous in that proofs of purchase, offers to convert media formats, and similar rights, can be embedded in a piece of digital media by encoding these items within title materials, and then encoding the title materials within a piece of digital media as described herein.

6.3 Title Encoding and Embedding Methods

6.3.1 Embedded Title Content

In some embodiments, titles are embedded within media files or other content structures enabling commerce systems to utilize titles while remaining compatible with legacy applications. In traditional web-based applications, an image (or other content structure) is referenced and displayed using a web browser. In some embodiments, the image is served to the browser from an external server, such as an ad server.

Title materials may be embedded advantageously within standard file formats so that they are transparently delivered to users along with the content encoded using the file format. Alternatively, links to title materials may be embedded within standard file formats. Users who are not using software that recognizes titles, e.g. those that are not "title enabled", see the "normal" image and can optionally follow the link to the commerce system; those that are "title enabled" receive additional benefits of immediate integration with digital commerce system applications.

6.3.2 Embedding Titles in Various Types of Digital Media

According to a particular class of embodiments, there are three methods for embedding title materials within standard file (media) formats. These are:

- Extend—Extend the format using mechanisms defined by the format.
- Re-purpose—Fit title materials into the format by using an existing feature of the format in a different manner than originally intended.
- Insert/Append—Insert title materials into, or append title materials to the end of the file in such a way that unaware software will ignore it.

Numerous challenges exist to embedding title materials within standard file formats. These include positioning within the file, size limitations, compatibility, and related issues. Positioning of the title materials within the digital file formats requires care, and sometimes rearrangement of portions of the media format in order to make the title materials easily accessible to title-aware applications (as described later). While the title materials can technically be positioned anywhere within the media, it is advantageous to order the title materials so they appear either at the front or back of the file. By placing the materials at the front or back of the file, the title materials are quickly visible to title-aware applications that scan the file looking for title materials. In cases where the file is small, this advantage is minimal. In other cases, such as an MPEG-4 encoded movie or even a JPEG, the file could be large enough that searching the whole file for materials becomes time consuming. The most advantageous positioning of the title materials within each file is generally a determination that must be made on a case-by-case basis after consideration of the file contents, the file format, how the file will be used, and the title materials that must be embedded. For example, in cases where the file is streamed to a user, it is nearly always advantageous to position the title materials within the first several kilobytes of the file.

Additionally, some of the file formats have limitations on the size of the title materials that can be inserted. Complete title objects can become large (e.g. >4 kb), and some of the file formats have limitations in the size of embedded materials. Each file format is different in its limitations. It becomes important to embed sufficient title materials so that the recognition process will succeed, but not require complete titles in places where space is limited, whilst still providing sufficient information to permit a title-aware application to recognize, complete any missing portions, and then use the embedded title (materials). Again, the most advantageous sizing of title materials within each file is an implementation dependent determination based upon file format, title, expected use, and other implementation-based factors.

One often overlooked aspect of embedding title materials within file formats, especially when using repurposed and append/insert methods of embedding title materials, is that of compatibly with existing software. Care must be taken when selecting the embedding method to ensure that existing software that uses files with title materials embedded still functions correctly. This is an implementation testing issue, in which a sample file with embedded title materials is tested using the software in question.

Figure 2:
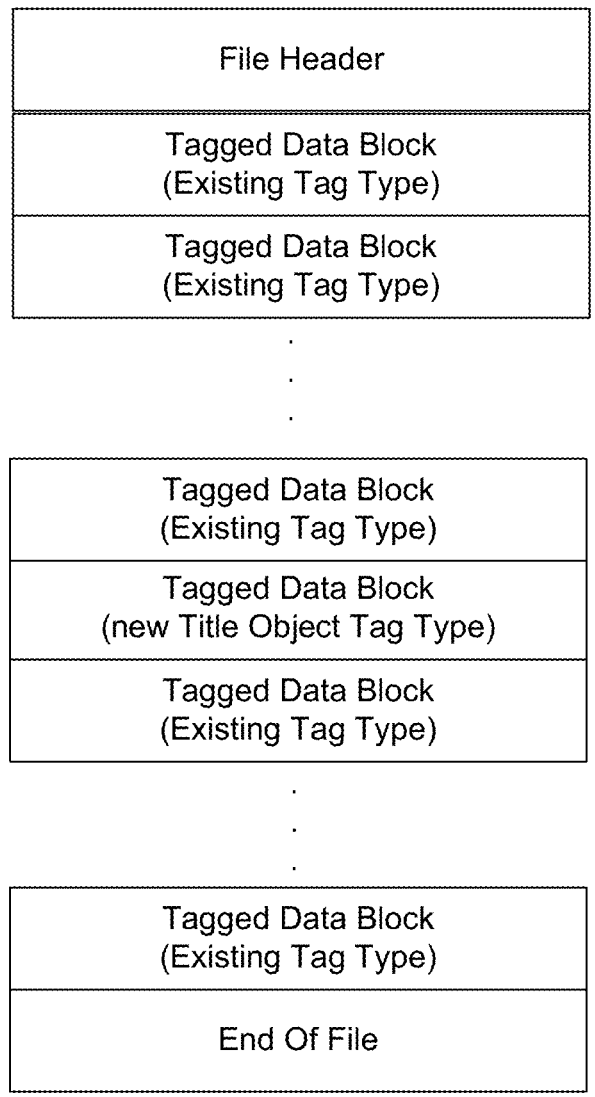
FIG. 2 depicts an extensible format digital media file with a new title materials tag type data block.

Extensible formats include mechanisms for adding extensions to the format in ways that do not affect software that is unaware of these extensions. This may be accomplished, for example, by setting aside a range of tag identifiers for this purpose, by specifying a tag specifically for the purpose of specifying extension tags, by using arbitrary length and content tag ID names and specifying that unrecognized tags be ignored, or by other mechanisms known to those having skill in the art. By using these mechanisms a new "title" data type may be added to files using such formats, without disrupting unaware software, and permitting easy identification of title data by software, such as Active Viewers (AVs) developed by Navio Systems Inc. of Cupertino, Calif., which are aware of the extension. FIG. 2 depicts an example of such a format. Examples of extensible standard formats include, but are not limited to, JPEG/JPG, GIF, PNG, AVI, SWF (Flash), WAV, AIFF, ASF, XHTML, VCF, RSS, and Open Office files.

Figure 3:
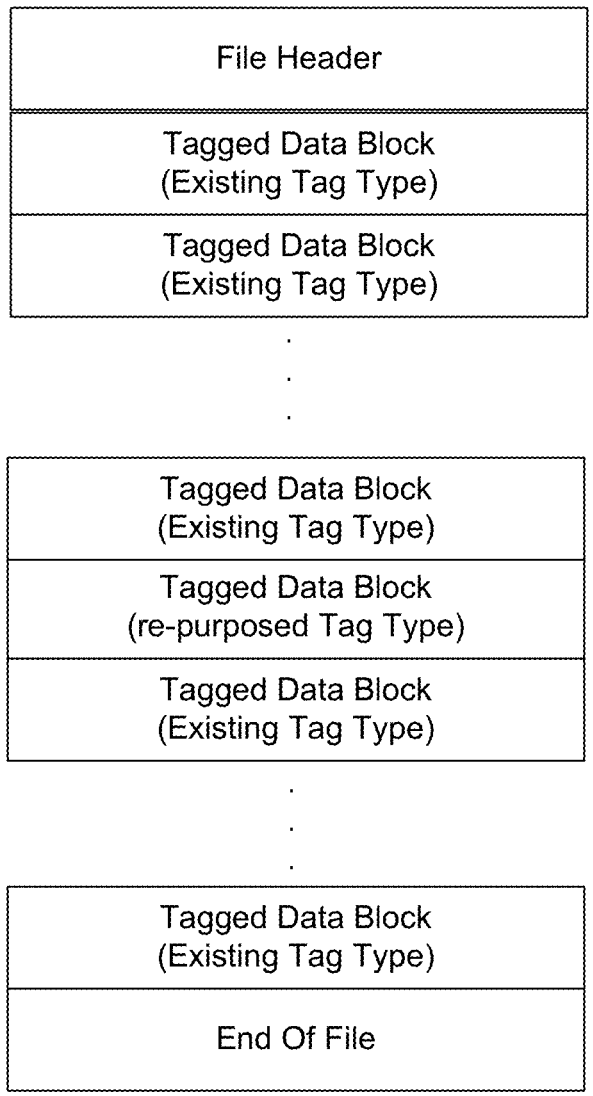
FIG. 3 depicts a re-purposable format digital media file with a re-purposed tag type data block.

Re-purposable formats do not typically include mechanisms for extending the format, but do include aspects which can be used for new purposes without disrupting software that does not recognize the repurposed systems. For example, a format may specify a method for including arbitrary text for purposes of making comments about the files contents. Software that displays the digital content does not depend on any particular content in comments, so titles, links to titles or other title materials can be placed in the comment fields of such files. If the software displays these comments or text fields in conjunction with the digital content, a user can manually follow links to external commerce systems. AVs or other title-aware components can locate the title materials in the comments of such files, while title-unaware software will not be disrupted since it will either ignore the comments, or treat it as arbitrary text data and have no functional dependency on the content. FIG. 3 depicts an example of such a format. Examples of standard formats which are re-purposable include, but are not limited to: QT (QuickTime), MID (MIDI), OGG, TIFF, DXF, EPS/PS (Postscript), PDF, RTF, MP3, AU, EMF, HTML, ZIP, MS Office files (.doc, .xls, etc)

Figure 4:
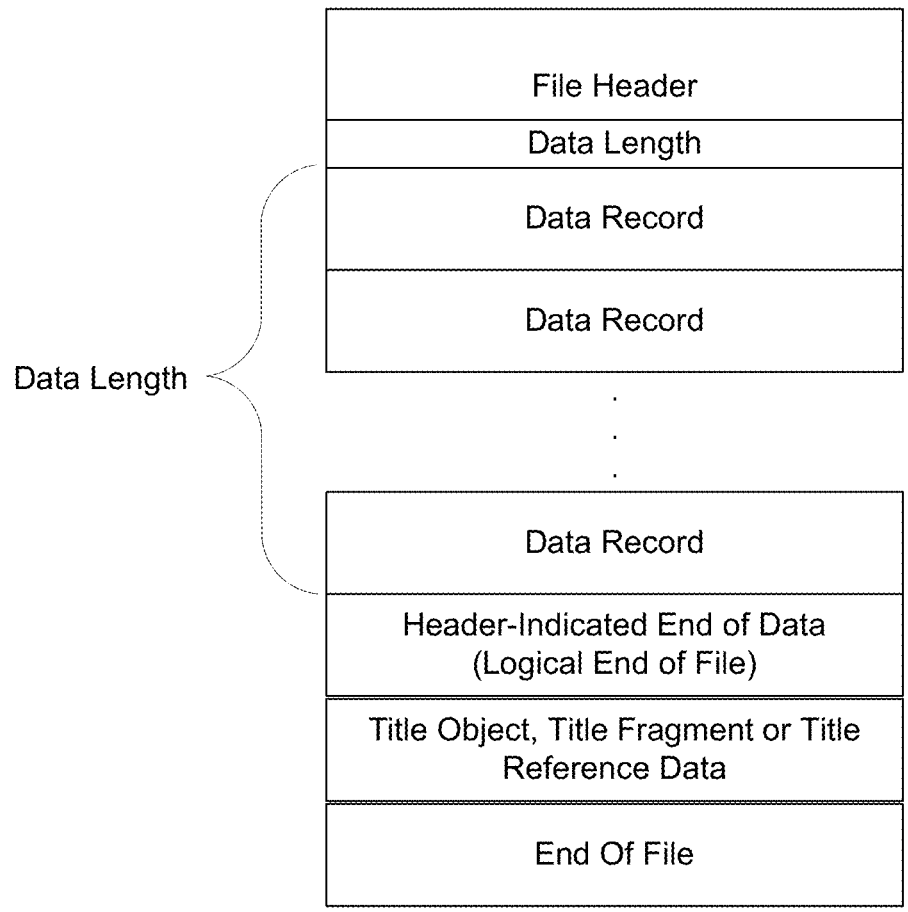
FIG. 4 depicts an appendable format digital media file with an appended data block.

Still other standard formats do not typically include extension mechanisms or re-purposable features, but do have formats which explicitly specify the portions of the media container that contain data, or which specify a "logical end of file" (where the data part of the media ends, whether this is the actual end of the media or not). By placing data outside of the specified data areas, or after the logical end of file, such data will be ignored by unaware software, but can be located by AVs and other aware software. FIG. 4 depicts an example of such a format. An example of a common format which is insertable/appendable is BMP (Windows Bitmap). Other formats that are appendable are those that have an end of file marker, such as the AZ appended to the end of certain text format files. When the processing program encounters the AZ, it stops processing the contents of the file.

6.3.2.1 Embedding in Extensible Formats: JFIF (JPEG)

As stated above, there are a number of file formats which can be extended by the addition of new structures and/or structure types without disrupting the functioning of existing software. The JFIF format will be used as an example of how this can be accomplished. Similar methods can be used on other extensible formats, as those having ordinary skill in the art will readily see.

The format commonly known as "JPG" is more properly referred to as "JPEG", for the Joint Photographic Experts Group, which is the organization which created the standard. JPEG refers primarily to the compression methods and the associated file format is referred to as "JFIF", for "JPEG File Interchange Format". JFIF enables JPEG bit streams to be exchanged between a wide variety of platforms and applications and is the format most commonly used on the Internet. The syntax of a JFIF file conforms to the syntax for interchange format defined in Annex B of ISO DIS 10918-1.

Figure 5:
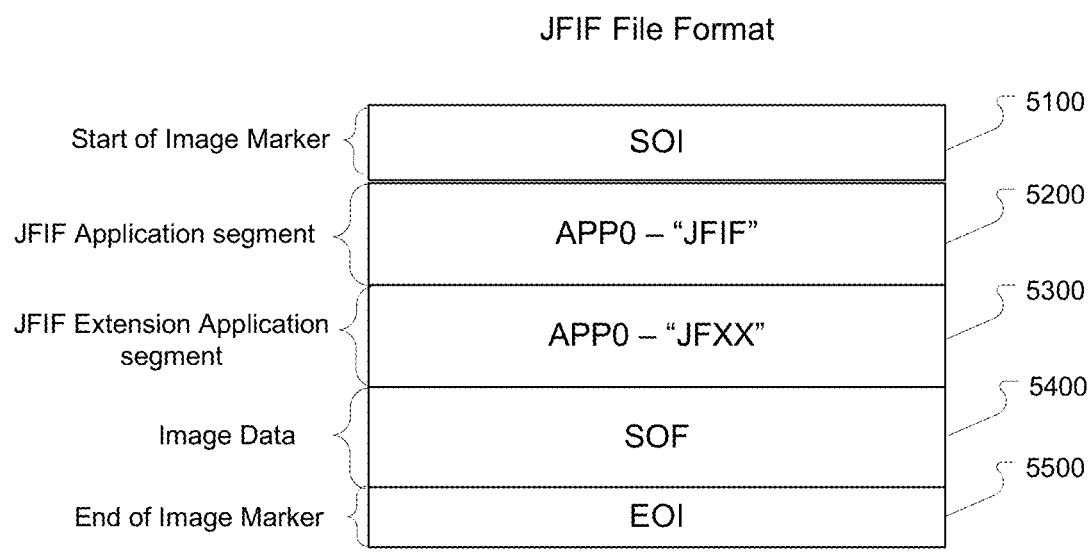
FIG. 5 depicts an example of a JFIF file format.

As depicted in FIG. 5, the JFIF file format includes a sequence of marked segments (5100 through 5500). Each segment includes a byte having a hexadecimal value of "FF", followed by a byte specifying the marker type (e.g. hexadecimal value "D8" for Start Of Image (SOI) (5100), "E0" for Application type Zero (APP0) (5200, 5300), or "D9" for End Of Image (EOI) (5500)). Each marker type may be followed by associated data for that segment, with the existence or format of such data determined by the type of the marker.

The SOI marker (5100) has no associated data and serves only to mark the beginning of the image. The SOI segment is followed immediately by an APP0 segment (5200). APP0 segments contain several data fields, such as a length field and a name field. The name field of an APP0 segment is used to determine which type of Application segment follows, and different types of APP0 segments have different associated data and formats.

The first segment following the SOI segment (5100) of a JFIF file must be an APP0 segment having a name string including the letters "JFIF" followed by a byte having all bits set to zero (a "null byte") (5200). This segment contains data that includes the version of the JFIF specification the file conforms to, image pixel density and thumbnail image information.

Following the "JFIF" APP0 segment (5200) is an optional Application Extension segment (5300). This APP0 segment has the name string "JFXX", followed by a null byte. If present, this segment is used to specify additional information about the thumbnail image contained in the "JFIF" segment (5200).

Following the SOI (5100), "JFIF" APP0 segment (5200), and any optional "JFXX" APP0 segment (5300), come various other segment types, such as comment (COM), additional APP0 segments and the actual image data segments, represented in the depiction by a Start Of Frame (SOF) segment (5400). The actual image data can include a number of different types of SOF segments, segments conveying color information, decoding information, etc., as described in the JPEG standard referenced previously. The final segment is an End Of Image (EOI) segment (5500), which is marked by the hexadecimal "FF" byte that introduces a marker, followed by the hexadecimal "D9" byte signifying an EOI marker.

Figure 6:
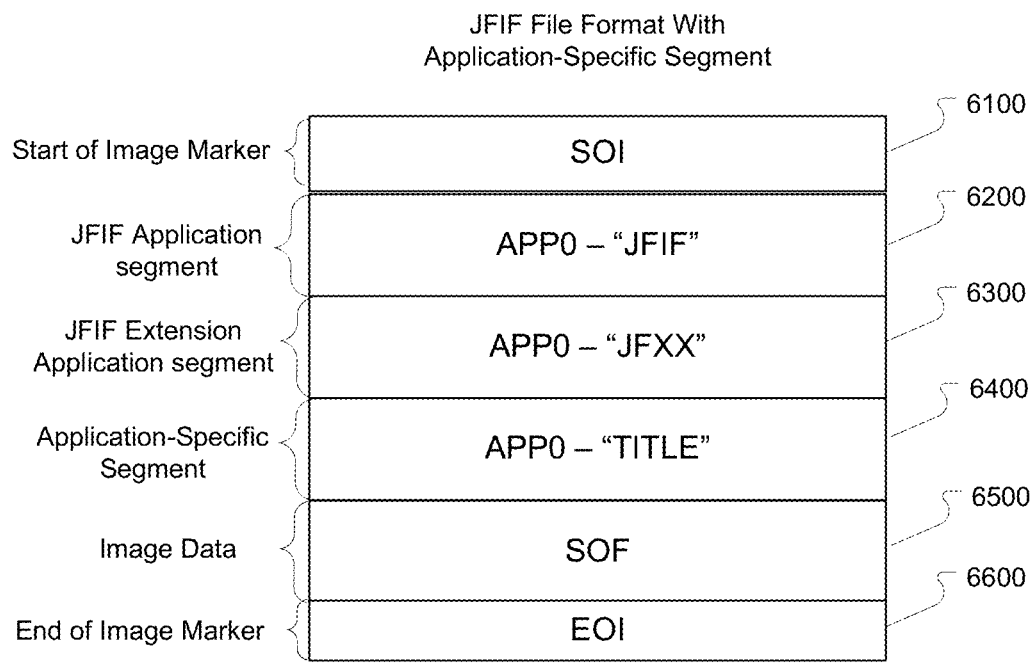
FIG. 6 depicts an example of a JFIF file format with a new "TITLE" type Application segment added.

By creating new APP0 segment names, new types of APP0 segments can be created to contain new types of data, such as title materials. As depicted in FIG. 6, such "Application-Specific" APP0 segments (6400) must follow after the SOI (6100), "JFIF" APP0 (6200) and any optional "JFXX" APP0 segments (6300) and must have name strings which are not "JFIF" or "JFXX", but which must be followed by a null byte. Other than these restrictions, the new APP0 segment names may be whatever string is required, though the specification suggests that these be organization or company names, and not common words, such as "dog" or "cat" to reduce the chance of different implementers choosing the same name for APP0 segments having different formats. In one embodiment, an APP0 segment name of "DBI" is used. The format and data included in a new APP0 segment type are up to the implementer, though the APP0 segment length field size will limit total segment size to 65,535 bytes. If more data than this is required, defining a "continuation" APP0 segment type is possible, which would allow arbitrarily large amounts of data to be included in a JFIF file, with limitations only being imposed by external factors, such as file system size or design.

For purposes of embedding title materials into JFIF files, an implementation can define a new APP0 segment type with the name "TITLE" (6400), to indicate that it contains title materials. The data fields and format of the associated data for this segment can include, for example and without limitation, the type of digital materials embedded (title, title stub, title reference, etc.), the name of the title issuer, a URL that locates the issuer, and the actual title materials. Properly constructed existing software that was not created with the ability to work with this new segment type will ignore it. Since there is no image data included in this segment, omitting it from processing will have no harmful effect on the image display or manipulation. Software which has been written to work with this new segment type will be able to locate the digital materials by scanning the file for a hexadecimal byte with the value "FF", which is followed by a byte with the value "E0" (APP0 marker), which is followed by two bytes of segment length, and then the string "TITLE" followed by a null byte. Such title-aware software can then read the TITLE block and extract the title materials from it.

In another implementation separate new APP0 segment types can be defined for each type of title materials that must be embedded. For example, an APP0 segment with a name of "TITLE_STUB" can be defined to contain title stub data, an APP0 segment with a name of "TITLE_LINK" can be defined to contain a link to other title materials, etc. How many such new APP0 segment types are required, and what their names should be will be within the understanding and discretion of those having skill in the art.

6.3.2.2 Embedding in Re-Purposable Formats: JFIF and MP3

As previously described, where extending a format is not an option, re-purposing an existing feature might be used. Both the JFIF and the MP3 formats will be used as examples of how this can be accomplished in more than one media format. Similar methods can be used on other re-purposable formats, as those having ordinary skill in the art will readily see.

The JFIF format, as previously described and depicted in FIG. 5, is made up of marked segments of data (5100 through 5500). One such segment type is the COM, or "comment" segment. This segment was included in the data format design to allow incorporation of arbitrary text into the image data for the purpose of describing the image, noting the ownership of the image, or for any other purpose. In a first embodiment, the title material's data is encoded into text form, using methods well known to those having skill in the art, such as specifying some or all data bytes as hexadecimal values in the form of ASCII strings, and included as an image comment segment, as shown in FIG. 7.

Figure 7:
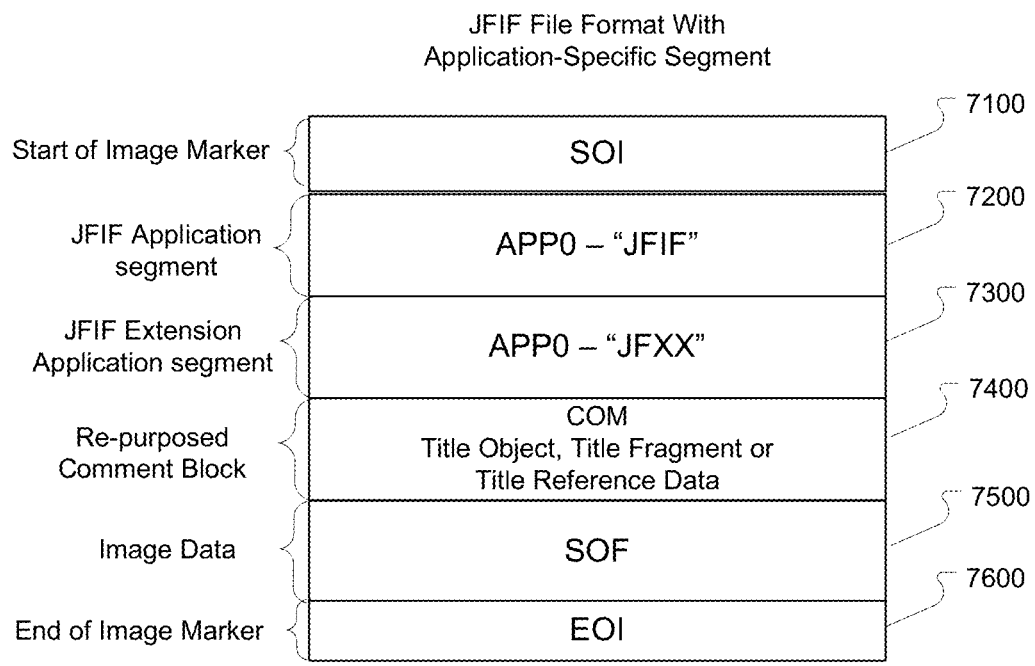
FIG. 7 depicts an example of a JFIF file format with a re-purposed comment segment containing title materials.

In FIG. 7 the SOI segment (7100), APP0-JFIF segment (7200), and any optional APP0-JFXX segment (7300) are followed by a COM segment (7400) containing the encoded title material(s). This is followed by the image data (7500) and EOI segments (7600). Software which is not title aware will not be prevented from displaying the image, since image display does not involve use of comment segments. Some editing software may display comment segments, but such software will not rely on the specific content of such blocks and will treat them as arbitrary text and so will not be adversely affected by inclusion of title materials in this manner. Software which is created to be title-aware, such as AVs, will locate the comment segment, un-encode the digital title material data into the original binary representation, and validate or otherwise work with the digital title materials as required.

The MP3 file format specification describes a record-based storage approach, in which a header, one or more attribute records, and content records are defined. For example, the ID3v2 specification defines a plurality of application-readable fields that may be used to encode a title or a title reference within an MP3-encoded file. In an MP3-encoded file, ID3v2 tags are encoded as a set of frames. MP3 players ignore ID3v2 tags that they are not able to understand. Each frame is uniquely identified by a code that describes its content.

In a first embodiment, a link to a title may be encoded within a URL-link frame. The ID3v2 specification identifies two types of ID3v2 frames that may be used preferably to store titles or title references. As described in the ID3v2 specification:

WCM—The 'Commercial information' frame is a URL pointing at a web page with information such as where the album can be bought. There may be more than one "WCM" frame in a tag.

WPB—The 'Publishers official webpage' frame is a URL pointing at the official web page for the publisher.

For example, a URL link frame of WCM is reserved for a URL that references "commercial information" about an MP3. The URL may reference a specific title that describes rights for the MP3 encoded contents. This embedding technique also may be used to embed a complete title within an MP3-encoded file.

Alternatively, a title or title link may be embedded within a "user defined" WXX frame within an MP3 encoded file. As described in the ID3v2 specification:

"This frame is intended for URL [URL] links concerning the audio file in a similar way to the other 'W' frames. The frame body includes a description of the string, represented as a terminated string, followed by the actual URL. The URL is always encoded with ISO-8859-1."

[ISO-8859-1]. There may be more than one "WXX" frame in each tag, but only one with the same description.

| User defined . . . | "WXX" |
|---|---|
| Frame size | $xx xx xx |
| Text encoding | $xx |
| Description | <textstring> $00 (00) |
| URL | <textstring> |

Other fields also may be suitable for embedding titles or links to titles. The above references provide examples of how to embed titles and links to titles advantageously within ID3 tags stored in MP3 files.

"In this frame any type of file can be encapsulated. After the header, 'Frame size' and 'Encoding' follows 'MIME type' [MIME] and Filename' for the encapsulated object, both represented as terminated strings encoded with ISO 8859-1 [ISO-8859-1]. The filename is case sensitive. Then follows a content description as terminated string, encoded as 'Encoding.' The last thing in the frame is the actual object. The first two strings may be omitted, leaving only their terminations."

MIME type is always an ISO-8859-1 text string. There may be more than one "GEO" frame in each tag, but only one with the same content descriptor.

| General encapsulated object | "GEO" |
|---|---|
| Frame size | $xx xx xx |
| Text encoding | $xx |
| MIME type | <textstring> $00 |
| Filename | <textstring> $00 (00) |
| Content description | <textstring> $00 (00) |
| Encapsulated object | <binary> |

For example, a title itself may be stored as an encapsulated object within a GEO frame. A title stored within an ID3v2 GEO frame may be identified by the MIME type for automated processing by an application.

Alternatively, ID3v2 frames may reference external content as described within the ID3v2 specification.

Similar mechanisms are provided in newer versions of the ID3 standard (e.g. ID3v4). The tag names have changed, but the usages of the frame types remain the same. Other frame types in this specification such as the "Commercial" and "Private data" frames may be used to encode titles or references to titles as described above.

Figure 8:
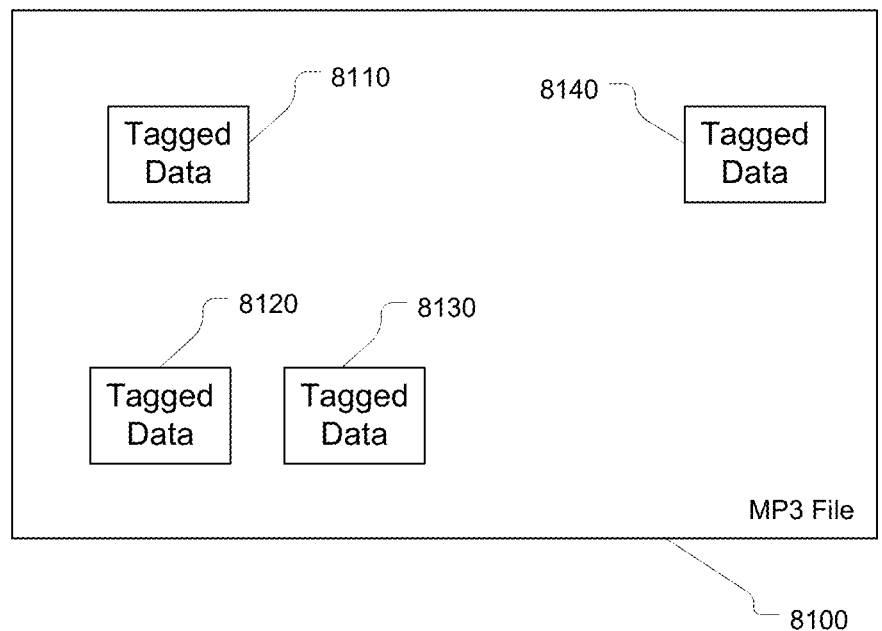
FIG. 8 depicts an MP3 tagged media format file with embedded content.

FIG. 8 depicts an MP3 tagged media format file with embedded content. 8100 is the MP3 file itself, which contains multiple tags (8110, 8120, 8130, and 8140). Each of these tags represents a different piece of information regarding the file; for example, 8110 can represent the name of the song, 8120 can represent the name of the artist, 8130 can represent the music itself, and 8140 can represent the title materials that allow the user to access the information in the other tags.

Figure 9:
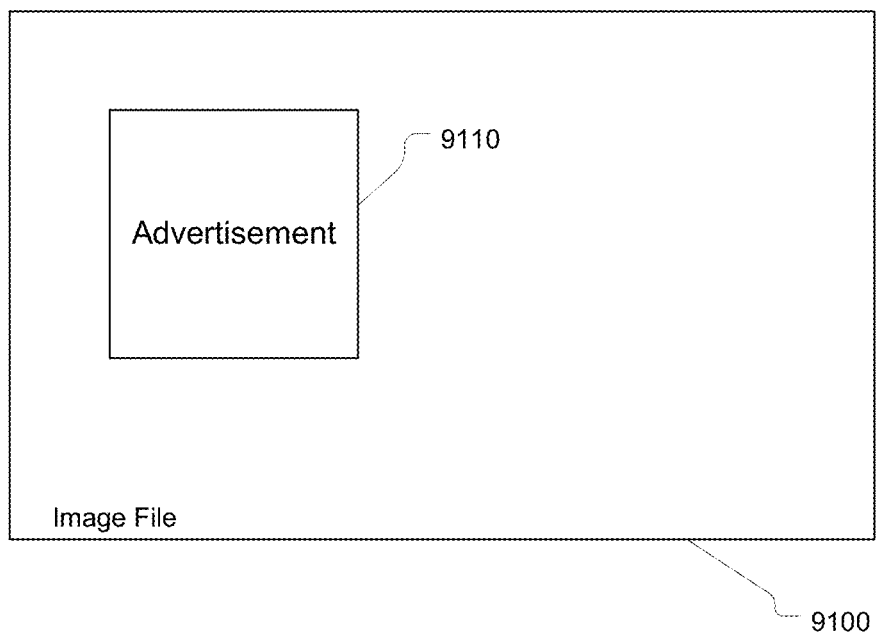
FIG. 9 depicts a digital image with embedded ad content.

FIG. 9 depicts a digital image with embedded ad content. 9100 is the image file, which can be in JPG, PNG, GIF or other similar format. 9110 is an embedded actionable ad.

6.3.2.3 Embedding in Appendable/Insertable Formats: JFIF (JPEG)

As previously described, where extending a format or re-purposing existing features are not options, appending or inserting data into the existing format might be possible. The JFIF (JPEG) format, previously described, will be used as an example of how this can be accomplished. Similar methods can be used on other appendable/insertable formats, as those having ordinary skill in the art will readily see.

Figure 10:
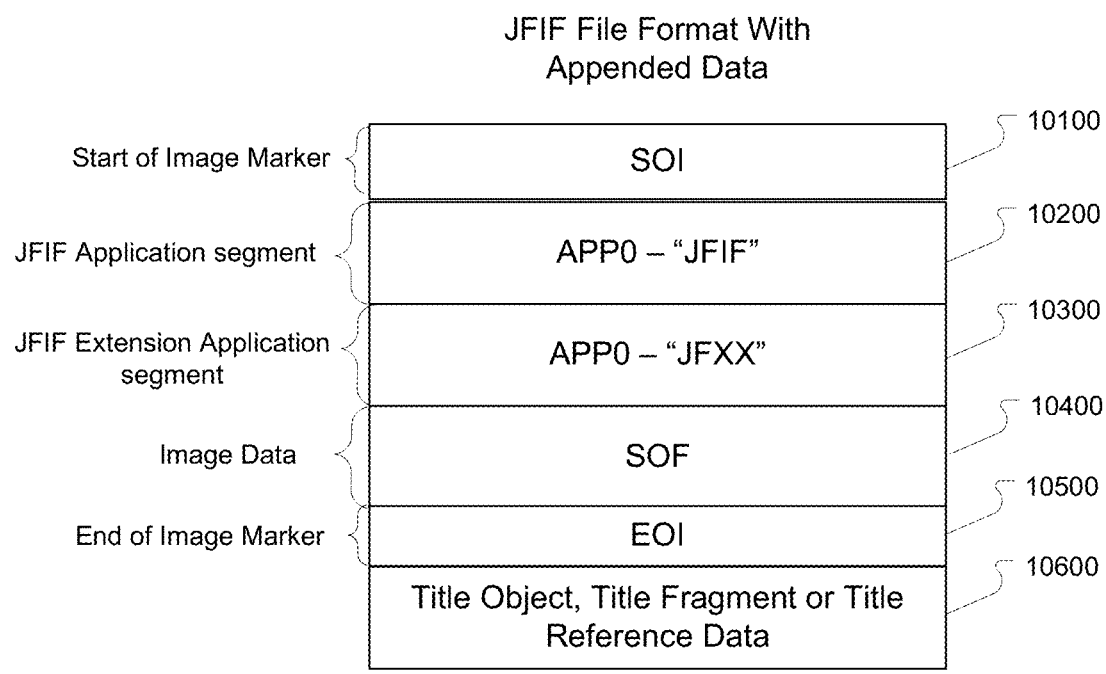
FIG. 10 depicts a JFIF file format with an appended data block containing title materials.

As depicted in FIG. 10, a JFIF file includes a series of marked data blocks. The first is the Start Of Image segment (10100). This is followed by the JFIF-required APP0 "JFIF" segment (10200) and any optional APP0 "JFXX" segments (10300). These are followed by the image data and other segments (10400) and finally the End Of Image (EOI) segment (10500). Properly designed software will search for segment markers by looking for the hexadecimal "FF" byte, followed by a known marker type specification byte, and process required segments, but will cease scanning at the EOI marker. This allows additional data, such as title materials (10600) to be appended to the JFIF file without interfering with the functioning of such properly designed preexisting software. Software which is title-aware can use the EOI marker bytes to locate the start of the title materials data, making it a simple matter to extract them from the JFIF image file for processing.

6.3.2.4 Formats Capable of Multiple Embedding Methods

There are some formats which are designed in such a manner as to allow them to fit more than one of the three embedding method categories. For example, the JFIF (JPEG) format, described above as an extensible format, also fits the re-purposable category, due to its having a segment type called "COM" (hexadecimal value "FE"), that is used to include arbitrary comments in the file. JPEG also fits the appendable/insertable category, due to the EOI marker being used to delimit the end of the JFIF image data and leaving open the possibility that additional data of arbitrary format might be appended to a JFIF file without disrupting the functioning of software designed to work with JFIF files, and allowing AV-aware software to locate such additional data easily. In some implementations, title materials may be embedded in a given file using more than one method, such as extending the format and appending data to the file. This can be done where different software implementations look for title materials in different places, where different types of title materials need to be stored in different ways, for redundancy, or for any other purpose deemed necessary by those having skill in the art.

6.3.3 Embedding in Structured Text

There are a number of structured text data encoding formats in common use on the Internet today. These include, for example, XML, HTML, and XHTML. As with digital media, described previously, it is usually possible to extend these formats or re-purpose an existing feature so as to allow for the inclusion of title materials.

Structured formats based on XML, or substantially similar to it, are inherently extensible. XML uses tags to describe the nature of data in XML documents, and new tags may be created as needed without violating the structure of the document. In particular uses of XML there may be cases where a tag used to specify title materials is already in use for another purpose, however proper use of "namespaces" (an XML feature used to prevent confusion when a particular tag is used for different purposes by different systems) can allow for the inclusion of tags for embedding title materials without interfering with existing XML schemas or processing software. Unaware software will not be disrupted by unrecognized tags. It will process them without being able to make use of the associated data other than, perhaps, to display it. Title-aware software can use standard XML-parsing systems to process the XML file and to extract the title materials from it as needed.

An example of an XML document without title materials can appear as follows:

```
<message>
<to>Bearer</to>
<from>Advertizer</from>
<heading>50% Off Coupon</heading>
<body>Come to the store by Saturday to get a 50% off coupon!</body>
</message>
```

The same XML document, with embedded title materials can appear as follows:

```
<message xmlns:title="http://www.titles.com/XML">
<to>Bearer</to>
<from>Advertizer</from>
<heading>50% Off Coupon</heading>
<body>Come to the store by Saturday to get a 50% off coupon!</body>
<title:materials>embedded, and possibly encoded, title
materials</title:materials>
</message>
```

HTML uses tags that look very much like XML tags, but in HTML the tags are used to describe how the associated information is to be displayed or used, rather than what it is, and the available tags are defined by standards and can not be created as needed by applications. There are some tags in the HTML standard that can be used to extend the capabilities of the language by re-purposing them. One example of a tag that can be used for this purpose is the <object> tag, which is used for embedding objects into HTML pages. A possible <object> tag used to specify title materials can appear similar to this:

```
<OBJECT DATA="50coupon.ttl" TYPE="binary/title" TITLE="Half
Off!" NAME="COUPON" WIDTH=150 HEIGHT=150>
<PARAM NAME=ISSUER VALUE="http://advertiser.com/dcs">
<A HREF="50coupon.jpg">Coupon: Half Off!</A>
</OBJECT>
```

XHTML (Extensible Hypertext Markup Language) is a specification that defines an XML document structure that is a superset of the HTML 4 standard tag set. It is used for the same purposes as HTML, but has all of the extensible features of XML incorporated into it. An XHTML document is an XML document, though some of the extensibility features of XML are restricted for conforming XHTML documents. As a superset of HTML, the same methods of embedding and retrieving title materials described above for HTML can also be used with XHTML documents. As an XML document, an XHTML document can also have digital materials embedded and retrieved using the methods described above for XML documents, though the result may not be strictly conforming to the XHTML standard. Properly written XHTML software should not be affected by this however, and should ignore unrecognized tags with the result that the XHTML page displays and behaves as expected with non-title-aware software 6.3.4 Associating Titles with Images in HTML and XML In other embodiments, titles are associated with images or other content using HTML-style linking in which a graphic is displayed to the user; and clicking on the graphic (or otherwise activating) causes the browser to follow a URL link or execute embedded content. In some embodiments, the URL link is to a piece of content that comprises a title. In other embodiments, the URL link is to an anchor point within the HTML page, which may comprise an embedded title. In still other embodiments, the content is embedded as part of the HTML associated with the graphic image being displayed for the user. Similar mechanisms may be used for XML-encodings of titles and associated items, such as RSS feeds or lists of materials such as gift wish lists or content catalogs.

In still other embodiments, titles are associated with specific content (or other titles) using a database or directory service. The association may be formed using a flat text file, the context that the URL or link is provided within, an algorithm that calculates the title materials required on the basis of the input URL, a database or directory service query, or other application-specific method that forms the association and permits the association to be retrieved upon demand by an application requesting the association. Other linkage methods may be utilized as source information as alternatives to using URLs.

6.3.5 Titles Encoded in Content Streams

In yet other embodiments, title materials, including offers and generic offers, are encoded in content and content delivery streams. Types of these streams include (but are not limited to) HTML, SGML, XML, IM, news, email, and RSS. Specialty-use lists such as wish lists or gift lists may be considered content streams for these purposes. Encoding within other types of content delivery stream is also envisioned. In a first example, titles, offers, and generic offers may be encoded within any stream that supports MIME type encoding mechanism for the content. The MIME type encoding may be used in conjunction with an intercept technology and an AV or title-aware component to process the title, offer, or generic offer. In a second example, titles, offers, and generic offers may be encoded using alternative encoding schemes such as XML to produce title-aware gift lists. In still other additional embodiments, a link to a title, offer, or generic offer may be encoded within content or content delivery streams. In some of these additional embodiments, a reference or pointer may be using a public reference such as a URI. In other additional embodiments, the reference or pointer may be an internal reference or pointer to a data structure, data element, or other storage element of a storage system.

It will be appreciated by those skilled in the art that the intercept and/or AV components may collect information about the execution location and environment where the title, offer, or generic offer is located, and use this information in the processing of the title, offer, or generic offer.

6.3.6 Title Identification

In some embodiments, title materials embedded or encoded in a file or content stream are recognized by an AV or other title-aware application on the basis of file type, unique ID, content tag, content marker or signature, referenced URL, MIME type, or other mechanism known to those skilled in the art.

In a first embodiment, title materials are stored in or referenced by at least part of a file name. A portion of the file name may be used to identify the content of the file as title materials, and may be used by the operating system to identify the title materials. In a Windows operating system embodiment, a portion of the file name commonly used by the operating system to identify file contents is the file suffix, e.g. the three letters after the last trailing period. In this example, a file name of mytitle.ttl may be identified as a title on the basis of the "TTL" file suffix. In some writings, the file suffix is called a file extension. Other file suffixes may be specified.

In a second embodiment, title materials may be identified using a unique identifier value associated with the title materials. In some embodiments, the unique identifier may be a Microsoft-compatible GUID. In other embodiments, the unique identifier may be a DCE-compatible UUID. The selection of the specific unique ID format will vary from embodiment to embodiment. Title materials may be associated with one unique ID, or may be associated with a plurality of unique IDs.

In a third embodiment, title materials may be identified using one or more content tags associated with or embedded within content. In some embodiments, a specific content tag is associated with title materials, such as in the descriptive HTML surrounding a title in a web page, or a descriptive tag within a specified file format (such as the MP3 file format, as described herein). Similarly, a content tag may be associated with title materials when the title materials are stored within or referenced by an XML storage mechanism. The content tag may be stored separately from the title materials, and may be stored using a different storage mechanism such as a database or directory service.

In a fourth embodiment, title materials may be identified using one or more content markers or signatures associated with or embedded within a piece of content. When embedded within a piece of content, a content marker or signature may be identified on the basis of its value. For example, title materials may have a content marker of "NavioTitle" embedded within the first 100 bytes of the title materials. In some embodiments, the content marker or signature is associated with specific title materials, such as in the descriptive HTML surrounding title materials embedded in a web page. Similarly, a content marker or signature may be associated with title materials when the title material(s) are stored within or referenced by an XML storage mechanism. The content marker or signature may be stored separately from the title materials, and may be stored using a different storage mechanism such as a database or directory service. Other file types, such as JFIF (JPEG) and GIF, can allow similar functionalities as will be apparent to those having ordinary skill in the art.

In a fifth embodiment, title materials may be identified using some or all of a reference URL. In one example embodiment, the URL references title materials by storage location. For example, an RSS stream may reference a URL for title materials stored in a well-known public storage or wallet for storage of title materials. The application processing the RSS stream may have a list of well-known title material storage locations, and may use a URL that defines the location of title materials as an indicator that the referenced object is a title. In an alternate embodiment, a title-aware application may make an association between a URL and a title to which it should be associated. In this embodiment, a URL may reference a specific piece of content (e.g. an MP3 file, an image) and the association is made between the URL or portion of the URL and a specific title object. The association may be one-to-one, or many-to-one, or one-to-many, depending upon implementation requirements. Thus, a single URL referencing external content may be associated with a single title object. Alternatively, a plurality of URLs may be associated with a single title object. Further alternatives may include a single URL's being associated with a plurality of title materials. The association may be formed using a flat text file, the context that the URL or link is provided within, an algorithm that calculates the title object on the basis of the input URL, a database, a directory service, or other application-specific method that forms the association and permits the association to be retrieved upon demand by an application requesting the association. Other linkage methods may be utilized as alternatives to using URLs.

In a sixth embodiment, title materials may be identified using a MIME type that describes the type of an embedded title object. MIME type may be associated with one or more flavors of title object. The same or different MIME type may be associated with each flavor of title materials. The association of MIME type and objects is made, in part, using OS or application provided facilities.

In a seventh embodiment, title materials may be identified using a binding-to-method invocation mechanism. In some embodiments, title materials may contain rights invocation instructions that may be bound directly to object dispatch or object broker mechanisms. The binding of these rights invocation instructions to an object dispatch or object broker mechanism may be used to identify title materials that is either specified by the dispatch or broker mechanism or is used as a source for the rights invocation instructions.

6.3.7 Invocation of Titles

In some embodiments, at least some of the rights specified within title materials are automatically invoked (e.g. the rights may be invoked) by title-aware applications whenever the application is invoked for a title. There are several common mechanisms for associating content types with applications that can process them, e.g. associating title materials with title-aware processes.

In a first example, the association may be made on the basis of file suffix/extension. In a Windows environment, this association is made by the operating system on the basis of registry settings that associate a file suffix/extension with a particular application that should be used to process a file of the specified file type. The user also may make this association manually.

In a second example, the association may be made on the basis of MIME type. Various applications, including email, web browsers, etc. manage the mapping of MIME type to handling application. The association for title materials is made using implementation dependent mechanisms for each application that handles MIME types.

In a third example, titles may be invoked directly from other titles or title fragments. Title fragments may be named within these title materials. A title aware application or service may follow these links and invoke the subsidiary title materials.

In a fourth example, titles may be invoked when rights specifications contained therein are associated with method invocation methods of external object dispatch or object broker components. In one embodiment of this example, a title right may be associated with a specific COM or DCOM method invocation and be called by the COM/DCOM object dispatcher whenever a specific COM/DCOM method is invoked. Alternative object brokers such as CORBA, DCE, or Java may be used in a similar manner.

6.3.8 Recognition of Title-Embedded Content

In other embodiments, titles are recognized by title-aware applications, for example AV provided by Navio Systems Inc. of Cupertino, Calif. In one set of embodiments, and as described in U.S. Patent Publication Nos. US 2007-0157320 A1 and US 2005-0234860 A1 NAV1P002X1), the entire disclosures of both of which are incorporated herein by reference, the AV is able to recognize titles when they are encountered from content type, file type, and other extrinsic attributes of the title. When working with title-embedded content, the AV is similarly able to recognize title-enabled content by scanning the content for a title. If found, the AV would recognize the title enabled content and process it in accordance with the title specifications.

For example, if an MP3 file is encoded with ID3v2 tags that comprise a link to a title or a title itself, an AV or title-enabled music player application may recognize a link encoded within a "WXX" record. Alternatively, the title-enabled application may recognize the title itself encoded within a "GEO" frame based upon the title structure or MIME type, and again take title-defined actions.

6.3.9 Title Aware Application Recognition of Title-Embedded Content

Other title-aware applications may recognize title embedded streams and content using techniques described elsewhere in this document.

6.4 Title (and Offer) Distribution Methods Using Embedded Title Materials

In some aspects, titles and title materials, including title-based offers as described herein are distributed using any means effective to distribute content. Thus, these title materials, including title-based offers, may be placed anywhere an image, piece of music, movie, document, or other content. In some embodiments, title materials, including title-based offers, may be distributed in other content structures, such as RSS feeds, HTML pages, etc. Depending upon the format and structure of the title materials used, the title materials may be immediately executed from its display location.

In the case of an RSS feed, title materials may be embedded, either as a reference or directly as content, as an element in an RSS feed. Such embedding permits readers of the RSS feed to recognize and process the title materials as they read their RSS feed. In a first embodiment, the user clicks on a link embedded in the RSS feed, which in turn executes a specific right within specific title materials. In some cases, these title materials may comprise one or more rights, and the effect of processing the title materials by selecting them in an RSS feed is to execute one or more rights specified in the title materials. In some embodiments, these title materials comprise one or more rights. In other embodiments, the title materials comprise a link to title materials.

In some processing environments, the link or embedded title is recognized by a title aware application.

7 BUSINESS MODEL EXAMPLES

7.1 Actionable Ad (Aka Ad Content as an Offer Title)

In still another aspect, the present invention permits a user to improve ad or click-thru business models with an "ad as an offer." Similarly, the present invention supports a new business model where content itself comprises the rights-enabled title object. Wherever an existing system has an ad or ad reference, the present invention can associate the ad or ad reference with title materials or offer (or generic offer) and execute the associated title object as necessary to fulfill the offer. Alternatively, the present invention permits the ad content (or application content) to comprise both content and title object, and the appropriate portions of the title object are invoked as necessary to facilitate use of the content.

An aspect of the invention permits an application to complete a transaction on the basis of title materials embedded or encoded within content in the background without a necessary requirement of a user becoming involved in the transaction. Embodiments of the present invention permit seamless association of ads and title materials (e.g. title or offer objects), and the subsequent invocation of the title or offer object on behalf of the user.

In one embodiment, the described technologies permit a title-aware application to match specific ads with titles on the basis of their URL or other reference materials. Thus, a title-aware application such as an AV may observe ads being presented to the user from an external ad server (e.g., Ad-Space) and may use the ad's URL as a tag to reference a particular title object as described above. The AV or other title-aware application may use the known association to provide efficient (e.g., one-click) fulfillment of the ad by executing the title object associated with the ad image (or ad image's URL). In an alternate embodiment, the AV may recognize an embedded title object (or link to title materials) within the ad itself, and provide fulfillment of the ad by executing the title embedded within it.

It will be noted that a trusted application such as an AV can operate as a trusted agent, and manage the payout of affiliate payments to site publishers, content providers, ad providers, and other interested parties. A trusted agent such as the AV also permits the aggregation of a plurality of purchased materials and the hiding of the disparate purchase sites/transactions from the user unless they specifically desire the information. The present invention further may be used advantageously to improve the click-through completion rates of ad-based models by simplifying a purchase or other transaction. The user need only click on the ad image for the transaction to be initiated, and the myriad of transactions that occur "under the hood" are hidden from the user, while still being performed in a trusted manner.

In an alternate embodiment, the described technologies permit a title-aware content use application to recognize embedded title materials and complete any necessary transactions to acquire rights for the content prior to, during, or subsequent to the use of the content. Thus, a title-aware content use application may observe content being used by the application and make an association with a particular title object as described above. The title-aware content use application may use the association to determine the title object to use, and provide fulfillment to obtain the necessary rights to use the content. In an alternate embodiment, the content being used may contain embedded title materials (or links to title object). The fulfillment may be performed before, concurrent with, or after the content itself is used. In an example embodiment, the title-aware content use application is an MP3 player, which is processing a set of MP3 files. In this example embodiment, the MP3 files being played are not currently licensed by the user for play. In a first use, the MP3 file is associated with title materials that specifies how rights may be obtained using one of the association methods described above. In this example, the association is made based upon the contents of one or more MP3 ID3v2 tags stored within the MP3 file that contains an embedded title object. The MP3 player recognizes the title object, and the title object is used to obtain the necessary rights/licenses to play the MP3 file without requiring intervention by the user. The right and/or licenses may be already present, may be stored on a server, or may be generated as required to permit the user to access the content.

Figure 11:
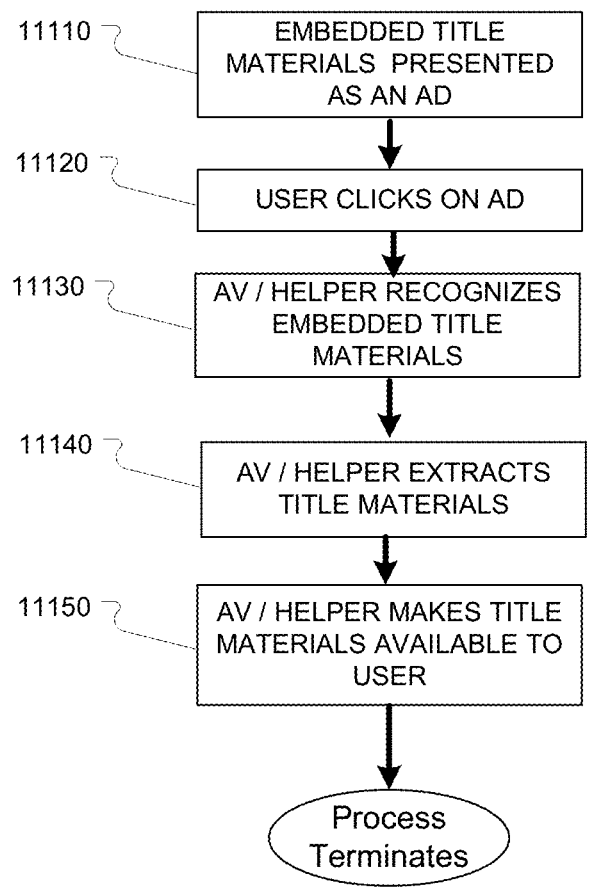
FIG. 11 is an example of a flow chart illustrating the process of redeeming title materials embedded in an ad with the assistance of the AV (or helper) application.

FIG. 11 is a flow chart illustrating the process of redeeming a title embedded in an ad with the assistance of the AV (or helper) application. In 11110, the embedded title is presented to the user as an ad. When the user clicks on the ad (11120), the AV/helper application recognizes the title embedded in the media (11130), extracts the title (11140), and makes the title available to the user (11150). Once the title is made available to the user, normal title processing operations, such as purchasing, redeeming one or more rights, etc. is available to the user.

It should be noted that such processing operations may be conducted using and in accordance with the title technologies and title processing architectures described in U.S. patent application Ser. No. 11/742,253 and Ser. No. 10/439,629, and U.S. Patent Publications No. US 2007-0157320 A1 and No. US 2005-0234860 A1 incorporated herein by reference above. However, it should also be noted that these are merely examples of technologies and architectures which are suitable for implementing embodiments of the invention, and that a wide variety of technologies and architectures which enable and/or employ digital bearer instruments may be employed to implement embodiments of the present invention.

7.2 Actionable Feeds (Aka Title Offer Feed)

In another embodiment of the invention, title materials, including titles, offers, generic offers, vouchers, and other forms and parts of titles may be distributed using feed-like "push" mechanisms. Unlike "pull" mechanisms, where the user must go to a specific page or site to view an offer from a merchant, "push" mechanisms permit title materials to be sent to users. These push mechanisms are collectively called feeds. This especially is advantageous when the materials provided as part of the feed comprise title materials. In a more particular embodiment, the materials provided as part of the feed comprise one or more rights. In another particular embodiment, the materials provided as part of the feed comprise a content embedded title object.

In a more specific embodiment, title materials are selected for pushing to a feed from a list of title materials characterized by one or more of the following:
Possessed by a user.
As the result of a search against a catalog or database.
Present in a catalog or database.
Upon the basis of a change to a catalog or database element.
As published in another feed.
As a result of matching to a keyword, URL, or other structure, as described above.
Heuristically selected based upon previous purchasing or browsing patterns (generally historical activities).
Sent to the user as a gift or award.
Based upon instructions from a consumer or site operator.

Various methods of providing feeds may be provided in various embodiments of the present invention. The feeds may include such diverse mechanisms as e-mail, RSS, Instant Messaging, and publishing to P2P networks. Users may execute one or more rights contained within title materials contained within a feed by either clicking on the rights (if embedded and the user has a title aware browser, or if the link is exposed by the user's feed software), by using the content (if the user has a title-aware content player), or by clicking on a button associated with the right (if using an AV).

Note that right feeds effectively disassociate specific title materials or title object fragments from their original published locations (or venues) while retaining the association between the original venue and the title materials.

This feature of offer feeds permits title materials to be copied from one venue to another, and displayed on a second venue while referencing the original venue. One or more disparate stubs comprising title fragments (or offer fragments) may be associated with each title, personalizing the relocated title for its new venue while retaining the original association. Similar techniques can be used to permit users to save one or more title materials provided as part of a right feed, an actionable ad, or otherwise embedded in a piece of digital media for later use while retaining its history and sourcing materials.

Figure 12:
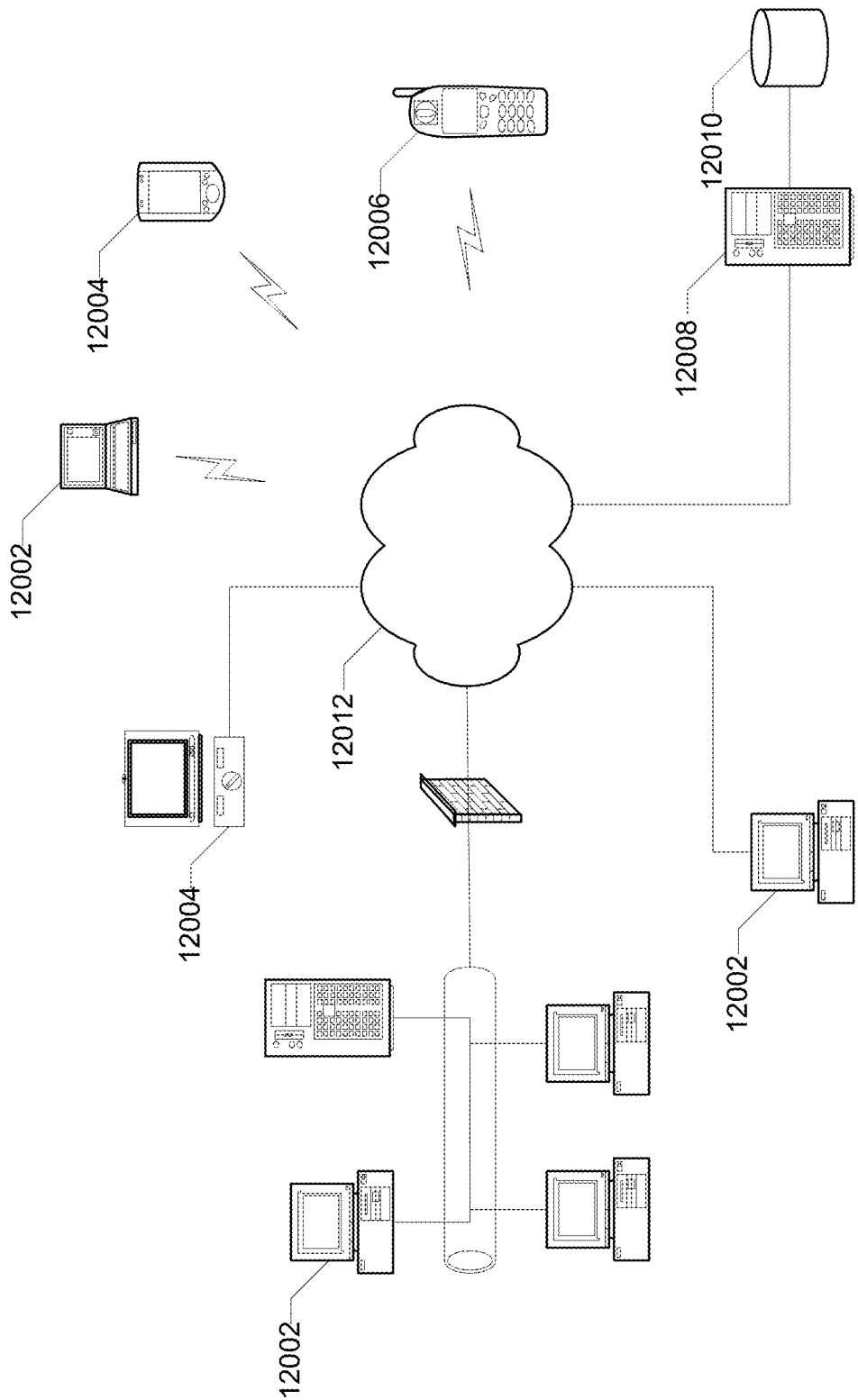
FIG. 12 is a simplified diagram of a network environment in which embodiments of the invention may be implemented.

It should be noted that embodiments of the present invention may be implemented using any of a wide variety of computing systems and platforms and in any network environment in which presenting digital media and facilitating related transactions using embedded title materials are useful functionalities. For example and as illustrated in FIG. 12, implementations are contemplated in which the digital media having embedded title materials are presented using interfaces on personal computers 12002, media computing platforms 12003 (e.g., gaming platforms, or cable and satellite set top boxes), handheld computing devices (e.g., PDAs) 12004, cell phones 12006, or any other type of communication platform. The logic (e.g., as embodied in computer code or instructions) which controls the various functionalities associated with presentation of the digital media having embedded title materials may be resident on such devices, e.g., as part of a browser or other application, or be served up from a remote site, e.g., in a Web page. The embedding of title materials in digital media, and the facilitation of transactions using such embedded title materials (e.g., using a digital commerce system or DCS as developed by Navio Systems Inc.) may be accomplished using one or more platforms (represented by server 12008 and data store 12010) remote from end user devices, either separately or in conjunction with such end user devices. The invention may also be practiced in a wide variety of network environments (represented by network 12012), e.g., TCP/IP-based networks, telecommunications networks, wireless networks, cable networks, etc.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method, comprising:
   facilitating presentation of a first representation of digital content to a first user, the first representation of digital content being derived from a first digital object characterized by a media format, the first digital object having first title materials embedded therein corresponding to a first digital bearer instrument, the first title materials being embedded in the first digital object in a configuration that allows processing of the first digital object by a process configured to recognize the media format even where the process is unable to recognize the first title materials, and wherein the first title materials are configured to cause initiation of a first transaction in response to the first user interacting with the first representation of the digital content;

facilitating the first transaction using the first digital bearer instrument in response to the initiation of the first transaction that results from the first user interacting with the first representation of the digital content; and facilitating presentation of a second representation of the digital content to a second user, the second representation of the digital content being derived from a second digital object characterized by the media format, the second digital object having second title materials embedded therein corresponding to a second digital bearer instrument, the second title materials being embedded in the second digital object in a configuration that allows processing of the second digital object by a process configured to recognize the media format even where the process is unable to recognize the second title materials;

wherein neither presentation of the second representation nor interaction with the second representation by the second user results in initiation of a second transaction involving the second digital bearer instrument.

2. The method of claim 1 wherein the media format comprises one or more of a text format, an audio format, a video format, an image format, or an animation format.

3. The method of claim 1 wherein the presentation of the first representation of the digital content involves streaming of the digital content.

4. The method of claim 1 wherein the media format is extensible, and wherein the first title materials are embedded in an extension to the first digital object.

5. The method of claim 1 wherein the media format includes a feature characterized by a first purpose unrelated to the first title materials, and wherein the first title materials are embedded in the first digital object using the feature.

6. The method of claim 1 wherein the media format defines an end of a file, and wherein the first title materials are embedded in the first digital object by appending the first title materials to the end of the file of the first digital object.

7. The method of claim 1 wherein the digital content comprises an advertisement and the first transaction involves to an offer relating to the advertisement, and wherein selection of the advertisement by the first user initiates acceptance of the offer.

8. The method of claim 1 further comprising facilitating storage of the first digital object by the first user.

9. A computer-implemented method, comprising:

embedding first title materials corresponding to a first digital bearer instrument in a first digital object characterized by a media format resulting in a configuration of the first digital object that allows processing of the first digital object by a process configured to recognize the media format even where the process is unable to recognize the first title materials, the first digital object corresponding to digital content and being configured to enable presentation of a first representation of the digital content;

facilitating a first transaction involving the first digital bearer instrument in response to interaction by a first user with the first representation of the digital content; and embedding second title materials corresponding to a second digital bearer instrument in a second digital object characterized by the media format resulting in a configuration of the second digital object that allows processing of the second digital object by a process configured to recognize the media format even where the process is unable to recognize the second title materials, the second digital object corresponding to the digital content and being configured to enable presentation of a second representation of the digital content;

wherein presentation of the second representation of the digital content to a second user does not result in initiation of a second transaction involving the second digital bearer instrument.

10. The method of claim 9 wherein the media format comprises one or more of a text format, an audio format, a video format, an image format, or an animation format.

11. The method of claim 9 further comprising transmitting the digital content to the first user.

12. The method of claim 11 wherein transmitting the digital content to the first user involves streaming of the digital content.

13. The method of claim 9 wherein the media format is extensible, and wherein embedding the first title materials in the first digital object comprises embedding the first title materials in an extension to the first digital object.

14. The method of claim 9 wherein the media format includes a feature characterized by a first purpose unrelated to the first title materials, and wherein embedding the first title materials in the first digital object comprises embedding the first title materials in the first digital object using the feature.

15. The method of claim 9 wherein the media format defines an end of a file, and wherein embedding the first title materials in the first digital object comprises appending the first title materials to the end of the file of the first digital object.

16. The method of claim 9 wherein the digital content comprises an advertisement and the first transaction involves an offer relating to the advertisement, and wherein facilitating the first transaction includes initiating acceptance of the offer in response to selection of the advertisement by the first user.

17. A non-transitory computer-readable medium having a digital object stored therein, the digital object corresponding to digital content and being configured in accordance with a media format to enable:

presentation of a first representation of the digital content to a first user, the first representation of digital content being derived from a first digital object characterized by a media format, the first digital object having first title materials embedded therein corresponding to a first digital bearer instrument, the first title materials being embedded in the first digital object in a configuration that allows processing of the first digital object by a process configured to recognize the media format even where the process is unable to recognize the first title materials, wherein the first title materials are configured to cause initiation of a first transaction in response to the first user interacting with the first representation of the digital content;

the first transaction using the first digital bearer instrument in response to the initiation of the first transaction that results from the first user interacting with the first representation of the digital content; and presentation of a second representation of the digital content to a second user, the second representation of the digital content being derived from a second digital object characterized by the media format, the second digital object having second title materials embedded therein corresponding to a second digital bearer instrument, the second title materials being embedded in the second digital object in a configuration that allows processing of the second digital object by a process configured to recognize the media format even where the process is unable to recognize the second title materials;

wherein neither presentation of the second representation nor interaction with the second representation by the second user results in initiation of a second transaction involving the second digital bearer instrument.

18. The computer-readable medium of claim 17 wherein the media format comprises one or more of a text format, an audio format, a video format, an image format, or an animation format.

19. The computer-readable medium of claim 17 wherein the media format is extensible, and wherein the first title materials are embedded in an extension to the first digital object.

20. The computer-readable medium of claim 17 wherein the presentation of the first representation of the digital content involves streaming of the digital content.

21. The computer-readable medium of claim 17 wherein the media format includes a feature characterized by a first purpose unrelated to the first title materials, and wherein the first title materials are embedded in the first digital object using the feature.

22. The computer-readable medium of claim 17 wherein the media format defines an end of a file, and wherein the first title materials are embedded in the first digital object by appending the first title materials to the end of the file of the first digital object.

23. The computer-readable medium of claim 17 wherein the digital content comprises an advertisement and the first transaction involves an offer relating to the advertisement, and wherein selection of the advertisement by the first user initiates acceptance of the offer.

\* \* \* \* \*